US009921136B2

(12) United States Patent
Wascat et al.

(10) Patent No.: US 9,921,136 B2
(45) Date of Patent: Mar. 20, 2018

(54) WIRELESS COLLECTION AND ANALYSIS OF MACHINE DATA

(71) Applicant: 01dB-METRAVIB, Société par Actions Simplifiée, Limonest (FR)

(72) Inventors: Bertrand Wascat, Ecully (FR); Philippe Poizat, Marcilly d'Azergues (FR); Patrick Labeyrie, Dardilly (FR); Thierry Mazoyer, Massieux (FR)

(73) Assignee: 01dB-Metravib, Societe Par Actions Simplifee (FR)

( * ) Notice: Subject to any disclaimer, the term of this patent is extended or adjusted under 35 U.S.C. 154(b) by 726 days.

(21) Appl. No.: 14/451,718

(22) Filed: Aug. 5, 2014

(65) Prior Publication Data

US 2016/0041068 A1    Feb. 11, 2016

(51) Int. Cl.
*G01B 5/30* (2006.01)
*G01M 99/00* (2011.01)
*H04W 4/00* (2018.01)

(52) U.S. Cl.
CPC ......... *G01M 99/005* (2013.01); *H04W 4/005* (2013.01)

(58) Field of Classification Search
CPC ............................ G01M 99/005; H04W 4/005
See application file for complete search history.

(56) References Cited

U.S. PATENT DOCUMENTS

| 5,870,699 A | 2/1999 | Canada et al. |
| 5,875,420 A | 2/1999 | Piety et al. |
| 5,922,963 A | 7/1999 | Piety et al. |
| 5,943,634 A | 8/1999 | Piety et al. |
| 6,053,047 A * | 4/2000 | Dister ................. G01M 13/028 73/593 |
| 6,078,874 A | 6/2000 | Piety et al. |
| 6,192,325 B1 | 2/2001 | Piety et al. |
| 7,142,990 B2 | 11/2006 | Bouse et al. |
| 7,313,484 B2 | 12/2007 | Lindberg et al. |
| 7,324,919 B2 | 1/2008 | Lindberg et al. |
| 7,458,269 B2 | 12/2008 | Loesl et al. |
| 7,711,519 B2 | 5/2010 | Lindberg et al. |

(Continued)

FOREIGN PATENT DOCUMENTS

JP    3073912 B2 *    8/2000

OTHER PUBLICATIONS

Translation of JP 30739192B2.*

*Primary Examiner* — Matthew G Marini
(74) *Attorney, Agent, or Firm* — Jordan and Koda, PLLC

(57) ABSTRACT

A sensor unit is configured as a single body, removably mounted in its entirety to a test point location on a machine so machine vibrations propagate into the single body. Within are an accelerometer, circuit board, wireless interface, signal processor, and battery. The sensor unit transmits sensor data wirelessly in real time to a data collection unit. A technician with data collection unit in hand goes from machine to machine, along a route of multiple test point locations on multiple machines, mounting and dismounting the sensor unit and collecting machine vibration data. The sensor unit is configured to reduce frequency response impacts of the mass and volume of the circuit board, wireless interface, signal processor, and battery on dynamic behavior of the sensor unit with respect to machine vibrations to achieve a frequency response rating comparable to a wired sensor.

20 Claims, 14 Drawing Sheets

(56) References Cited

U.S. PATENT DOCUMENTS

| | | |
|---|---|---|
| 7,805,281 B2 | 9/2010 | Leigh |
| 8,174,402 B2 | 5/2012 | Bouse et al. |
| 8,370,109 B2 | 2/2013 | Van Dyke et al. |
| 2003/0177829 A1* | 9/2003 | Kicher ................ G01P 1/003 73/493 |
| 2006/0017821 A1* | 1/2006 | Garvey, III ............ H04N 5/77 348/231.3 |
| 2008/0068559 A1* | 3/2008 | Howell ............... G01C 22/006 351/158 |
| 2014/0121996 A1 | 5/2014 | Piety et al. |
| 2014/0152426 A1* | 6/2014 | Murphy ............... F16C 19/52 340/10.51 |

* cited by examiner

WIRELESS COLLECTION AND ANALYSIS OF MACHINE DATA

RELATED SPECIFICATION

This application is related to commonly-assigned, U.S. patent application Ser. No. 14/451,777 of Wascat et al. filed on the same day for "Automated Rotating-Machine Fault Diagnosis with Confidence Level Indication," and is incorporated herein in its entirety by reference.

BACKGROUND OF THE INVENTION

This invention relates generally to the collection and analysis of machine diagnostic data, such as vibration data, temperature, and rotation speed. More particularly, this invention relates to methods and apparatus for wireless data acquisition of machine diagnostic data for use in the automated diagnosis, and predictive maintenance of machines having moving parts.

Many types of machines are used in a production or manufacturing facility, such as in the production of consumer and industrial goods and in the delivery of basic utility services. Because of the importance of these machines in meeting production and service requirements, taking a machine offline unexpectedly due to a failure can be costly. Accordingly, it is desirable to implement an effective predictive maintenance program to keep the machines in good working condition. Of concern is that a machine part that is moving or being moved against may result in decreased machine performance and reliability. Eventually if a deteriorating condition is not detected a failure may occur. Examples of such machines for which it is desirable to collect data for preventive maintenance are motors, pumps, generators, compressors, lathes and other machines having rotating or other moving parts, such as a shaft, rotor, or bearings.

Most predictive maintenance programs include the periodic collection of machine data, such as such as vibration data and temperature. Vibration data may be sensed using an accelerometer positioned at the machine. Similarly, temperature may be sensed with a temperature sensor positioned at the machine. In some applications, a maintenance technician holds a hand-held sensor in contact with a location on a machine during collection of desired data. In other applications a cable is used to connect the sensor to a data collection device.

Experience has revealed that the use of cables or the close proximity of the technician to the machine during data acquisition is a potential hazard. For example, the cables can become caught or tangled in moving parts of the machine possibly injuring the technician or damaging the machine parts. In addition the cables themselves may be damaged from the continued connection and disconnection at the machines and the continued relocation from machine to machine and facility to facility. A damaged cable can compromise the data collection process and the reliability of the collected data.

The use of cables also can add time to the data collection process when the technician needs to assemble and disassemble connections to move among multiple test point locations of multiple machines in a given facility.

Another shortcoming of conventional data collection methods is that technician errors can occur in identifying a machine or test point, or in installing components for setting up data collection at a test point. Although instructions may be provided to the technician, the technician still may misidentify a test point, or orient or otherwise position a sensor inaccurately at a given test point.

Accordingly, there is a need for a safe, effective, reliable, repeatable data collection method, and an apparatus for achieving machine diagnostic data collection, including machine vibration data collection. These and other needs are addressed by various embodiments of the present invention.

SUMMARY OF THE INVENTION

The present invention is directed to a machine diagnostic data collection system for wirelessly collecting vibration data and other diagnostic data from a machine having moving parts. The system includes at least a portable, machine-diagnostic, data collection unit and a wireless sensor unit. The wireless sensor unit is mounted at a test point location on a machine for sensing the machine's vibration at such test point. Raw sensor data is captured by the sensor unit and wirelessly transmitted in real time to the data collection unit. The machine diagnostic data collection system is configured to perform machine diagnostic data collection, automated diagnosis, and predictive maintenance of machines. Machine diagnostic data includes vibration data, temperature data, rotations speeds, and other data indicative of machine performance and reliability.

The sensor unit is configured as a single body, removably mounted in its entirety to a test point location on a machine so machine vibrations propagate into the single body. Within are an accelerometer, circuit board, wireless interface, signal processor, and battery. The sensor unit transmits sensor data wirelessly in real time to the data collection unit. A technician with data collection unit in hand goes from machine to machine, along a route of multiple test point locations on multiple machines, mounting and dismounting the sensor unit and collecting machine vibration data and other machine diagnostic data. The sensor unit is configured to reduce frequency response impacts of the mass and volume of the circuit board, wireless interface, signal processor, and battery on dynamic behavior of the sensor unit with respect to machine vibrations to achieve a frequency response as good as achieved by wired sensors, In some embodiments the data collection device also performs local processing of collected data, such as for automated diagnosis performed in near real time and real time during and immediately after data collection at a given test point or set of test points. In some embodiments a separate analysis unit (e.g., a computing unit) communicates with the data collection unit and receives collected data and local diagnosis results from the data collection unit. The analysis unit performs additional analysis and stores the data at a data storage center to compile a history of collected data and analysis results.

The data collection unit includes a wireless data interface, a processor, a memory, a display, an operator input device, a battery, and other components. In some embodiments an embedded camera is included for taking photographs, infrared images, and/or scanning a quick response (QR) code (e.g., bar code mounted on the machine). As a technician goes from machine to machine, the data collection unit scans a given machine's QR code to identify the machine. A data module associated with the identified machine is stored in memory of the data collection unit or loaded into memory of the data collection unit and used to provide a test point collection prescription, including setup parameters and setup and collection instructions. The processor is configured to operate with the display and user input device to provide a user interface so as to display data collection progress and accept user inputs.

According to the invention, the sensor unit body houses a Wi-Fi interface, a signal processor, other components affixed to a circuit board, and a rechargeable battery. The extra volume and mass for such electrical components and battery (as compared to a conventional sensor—e.g., a sensor as a separate body coupled by a cable to another body having a signal processor which samples the sensor) impact the frequency response characteristic of the sensor unit. The mechanical construction of the sensor unit includes features offsetting adverse impacts of such extra mass and weight to the sensor unit's frequency response.

Frequency response is the sensor unit's (e.g., accelerometer's) electrical output to mechanical input specified over the device's entire frequency range. A frequency response specification indicates how much the unit's (e.g., accelerometer's) sensitivity can deviate from the reference sensitivity at any frequency within its specified frequency range of operation. In a best mode embodiment the sensor unit has a frequency response rating of +/−3 db at 15 kHz or greater on a z-axis and +/−1 db at 10 kHz or greater on a z-axis, which means that the electrical output in response to the machine's vibrations (as the reference) is off by no more than +/−3 db at 15 kHz and no more than +/−1 db at the 10 kHz frequency on a z-axis vibration measurement. In a preferred embodiment the sensor unit has a frequency response rating of +/−3 db at 12 kHz or greater on the z-axis, and +/−1 db at 5 kHz or greater on a z-axis. The frequency ratings are based on laboratory measurements using a vibrating pot methodology.

Specific features are included in the mechanical construction according to the invention to minimize noise, attributable to the sensor unit's mechanical composition, which would compromise the frequency response of the sensor unit. Such noise can adversely impact the accuracy and reliability of at least a vibration or accelerometer sensor of the sensor unit. In particular, the sensor unit decouples (in part) its vibration sensor(s) from a portion of the sensor unit that includes the electronic components and battery. To do so, the sensor unit includes an elastomeric body spaced from the sensor (e.g., via an air gap) that serves with the air gap to decouple (in part) vibrations propagating through a base portion of the sensor unit from vibrations propagating through an upper portion of the sensor unit.

The elastomeric body serving to decouple the sensor from the upper portion also serves as a damping body positioned at a seat of the circuit board and battery. Another elastomeric body is positioned along a face of the battery to provide additional damping of vibrations at the battery. Such damping limits the adverse impact of the battery on the sensor unit's frequency response. Still another elastomeric body is positioned at an opposite end of the circuit board and battery from the elastomeric body serving as the seat to provide still additional damping and isolation. Accordingly, damping is provided at each end of the circuit board and battery, and along an entire face of the battery to limit the adverse contribution of the circuit board, the components thereon, and the battery to the sensor unit's frequency response.

An additional feature of the mechanical construction that is beneficial for achieving a desired frequency response of the sensor unit is the construction of the housing of the upper portion. Such housing is formed as a rigid body to minimize noise from being introduced in reflected vibrations, thereby further minimizing disturbances to the propagating vibrations to which the sensor is exposed. A longitudinal profile of the upper housing includes a desirable contour as described below in the detailed description.

According to a method of collecting data wirelessly with the sensor unit and data collection unit, machine vibrations propagate from a machine into the removably mounted sensor unit. The vibrations propagate through the body of the sensor unit, including within the area of the Wi-Fi transmitter, signal processor, other circuits and the rechargeable battery. The elastomeric bodies damp the vibrations during vibration sensing, sensor sampling and raw sensor data transmission.

Advantages of the wireless sensor unit of this invention include improved operator safety while measuring vibrations from rotating parts of a machine, due to a decreased risk of entangling cables that otherwise may extend from the sensor to the data collection unit. The absence of a cable also reduces the weight of materials that the operator needs to carry around a facility when performing a machine diagnostic data collection route.

Another advantage is an improved reliability of the vibration measurements. Previously, a wired sensor has been mounted to one test point after another on each bearing of the machine and from one machine to another, until all machines to be monitored in a plant or facility have been measured. As performed for an entire factory, and then different factories in turn (and/or the same factories over again), the many mechanical solicitations of mounting and dismounting the wired sensor, along with the moving sequences of the sensor and cable, and the transportation of the sensor and cable, result eventually in consequential damage to the cable and the shortening of the cable's lifetime. A bad condition of the cable can result in degraded measurements, in which noise or disturbances are added to the measured signal. Such noise or other disturbances may lead to incorrect diagnosis of the machine, which diagnosis has direct impact on the scheduling of maintenance operations and on the process production uptime of the machine.

Still another advantage of the wireless sensor unit is that signal degradation of the sensor readings is reduced or avoided, because the output signal does not travel several feet along a cable before being read by a signal processor to be stored. Accordingly, there is an improvement in the reliability of the sensor readings by locating the signal processor proximate to the sensor in the same body and housing as the sensor.

The inventions will be better understood by reference to the following detailed description taken in conjunction with the accompanying drawings.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

In the following description, for purposes of explanation and not limitation, specific details may be set forth, such as particular terminals, devices, components, techniques, protocols, interfaces, hardware, etc. in order to provide a thorough understanding of the present invention. However, it will be apparent to one skilled in the art that the present invention may be practiced in other embodiments that depart from these specific details. Detailed descriptions of well-known computers, terminals, devices, phones, components, techniques, protocols, interfaces, and hardware are omitted so as not to obscure the description of the present invention. Accordingly, computer components and other components, protocols, and interfaces, known to one of ordinary skill in the art of machine vibration data collection and analysis are intended to be inferred into the detailed description.

Machine Diagnostic Data Collection and Analysis System

Figure 1:
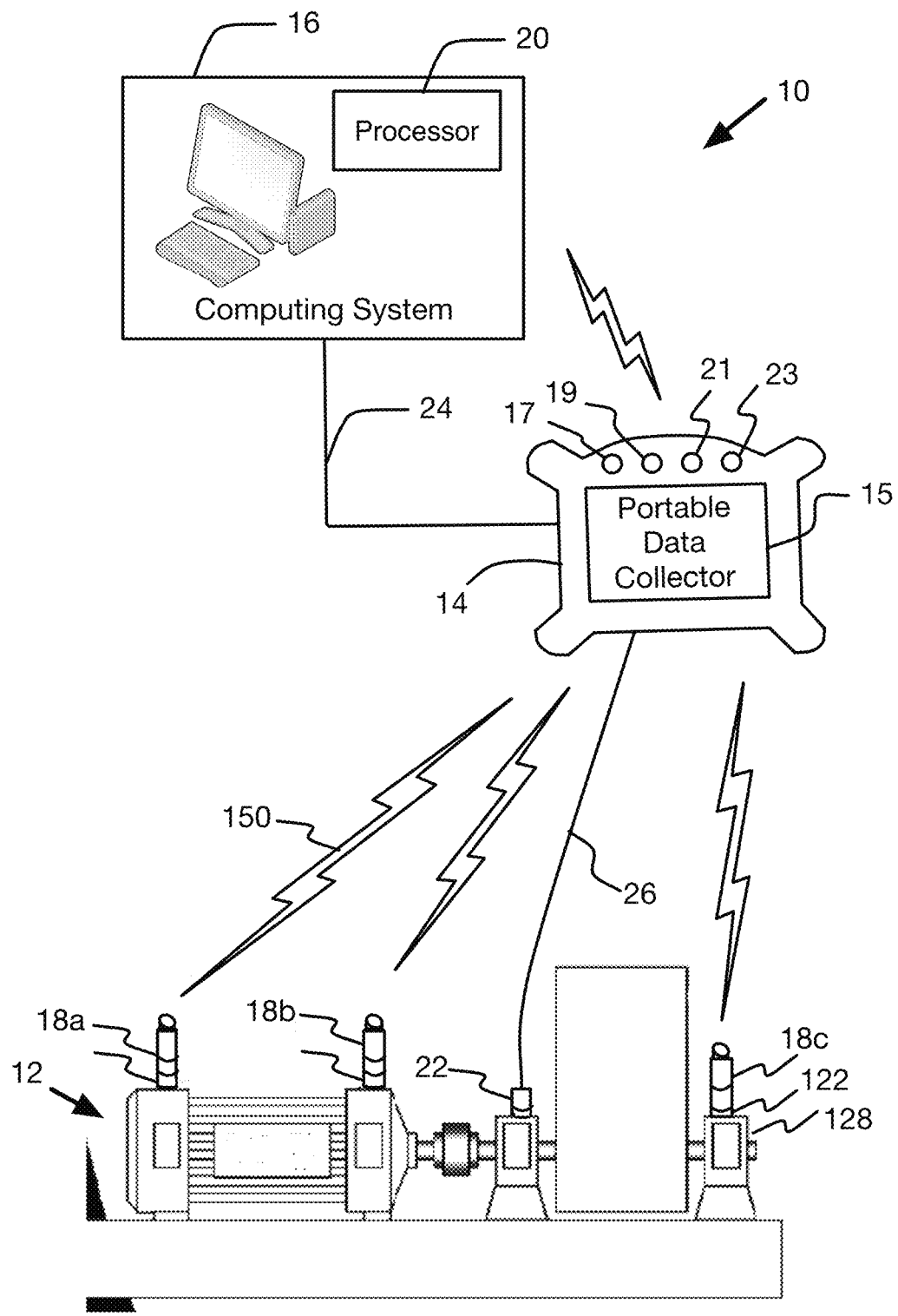
FIG. 1 is a diagram of a machine diagnostic data collection and analysis system according to an embodiment of this invention.

FIG. 1 shows a machine diagnostic data collection and analysis system 10 according to an embodiment of this invention. Diagnostic data as used herein means data obtained by inspection of a machine using a sensing device. The system 10 serves as a condition-monitoring tool useful in predictive maintenance of a machine 12, such as a motor, pump, generator, compressor, or lathe, having moving parts, such as a shaft, rotor, or bearings. In some embodiments the system 10 is configured to provide real time feedback so as to adjust the machine 12 during operation as the machine parts rotate, or the machine parts otherwise move so as to cause vibration.

In a preferred embodiment the machine diagnostic data collection and analysis system 10 includes a host computing system 16, a handheld, portable machine diagnostic data collection device 14, and one or more sensor units 18. Machine diagnostic data is collected in real time by the data collection device 14 wirelessly using one or more wireless sensor units 18 (e.g., 18a, 18b, 18c), via a wired connection 26 using a wired sensor 22, or via an embedded sensing device (e.g., camera CCD/sensor, pyrometer, stroboscope). The collected data is processed locally using automated diagnosis processes to perform automated diagnosis. In addition, the collected data and automated diagnosis results are sent to the host computing system 16 for additional signal processing and analysis.

Wireless communication between the sensor unit 18 and the data collection device 14 enables the technician to take measurements from a farther distance from the machine 12 than with a sensor 22 coupled to the data collection unit by a cable 26. Wireless data collection also allows the technician to take measurements from test point locations that otherwise could not be accessed using a cable. For example, the sensor unit may be placed inside the machine, such as under a protective housing of the machine in a location where a cable for a sensor would get caught in the moving parts or be undesirably close to moving parts. In an exemplary embodiment the technician may step back from 10 to 20 m from the machine after placing the wireless sensor unit at a test point on the machine, while still allowing the sensor unit 18 to be in wireless communication with the data collection device 14. The technician can even stand in another room within such distance limit with a wall between the data collection device 14 and the sensor unit 18 while data is being collected.

Although wireless data collection methods improve personnel safety, there may be situations where it is desirable to use a wired sensor 22 to collect vibration data. For example the sensor unit has a larger volume and mass than a wired sensor due to the added components. The volume available to place the sensor unit 18 may too small for the sensor unit 18 to fit. To access such a test point the data collection device 14 is wired to sensor 22 to perform vibration data collection. Of significance is that the data collection device 14 can be used to perform data collection via a wired accelerometer that transmits an analog signal through a cable to the data collection device, and also perform wireless data collection via a wireless link 150 with a sensor unit 18 that wirelessly transmits raw sensor measurement readings to the data collection device 14 without the use of a cable. Such wired and wireless data collection is performed concurrently or at separate times.

Host Computing System

In various embodiments the host computing system 16 is a general-purpose computer, such as a workstation, desktop computer, laptop computer, tablet computer, personal digital assistant device (PDA), or a smartphone-computing device. The computing system 16 is loaded with software, and optionally includes peripheral devices.

The computing system 16 includes a processor 20, a display device, one or more input devices (e.g., keys, buttons, keyboard, tablet keyboard, pointing device, stylus), volatile memory, non-volatile memory, and various input/output interfaces. The computing system 16 is configured for analyzing collected machine data to perform machine 12 vibration analysis and other machine diagnostic analysis. The processor 20 executes software made up of computer programs, databases, and other data constructs. The software configures the processor 20 and computing system 16 to process diagnostic data collected from one or more test points of a machine to detect mass unbalance, misalignment, a mounting defect, moving part looseness, structural resonance, a lubrication defect, rolling element bearings defects (e.g., pitting, general wear), gear defects (e.g., tooth wear, broken tooth, backlash), and cavitation. The software configures the processor 20 and computing system 16 to process diagnostic data collected from one or more test points of one or more machines to perform vibration analysis, temperature analysis, shock pulse measuring, spectrum analysis of shock pulse results, fast Fourier transform of vibration data, fault detection, tachometry, and other machine diagnostic and predictive maintenance analysis for one or more machines.

In a given embodiment the computing system 16 communicates with the handheld data collection device 14 to receive the machine diagnostic data, including vibration data. The computing system 16 communicates with data collection device 14 through a wireless connection (e.g., interface implementing Bluetooth standard; interface implementing a Wi-Fi standard), or through a wired interface 24 (e.g., via an Ethernet interface; via a USB interface; via a thunderbolt or firewire interface; via another standard or proprietary wired interface). Peripheral devices of the computing system 16 in various embodiments include printer(s), flash drive(s) other peripheral storage devices, and scanning devices. The host computing system 16 may be coupled to a communications network, such as an internet protocol-based network, another global access network, a local work group, a local area network, or a wide area network to share collected data and analysis. For example reports are transmitted, and analysis is distributed among multiple computing systems communicating over any such network.

Handheld Machine Diagnostic Data Collection Device

Figure 2:
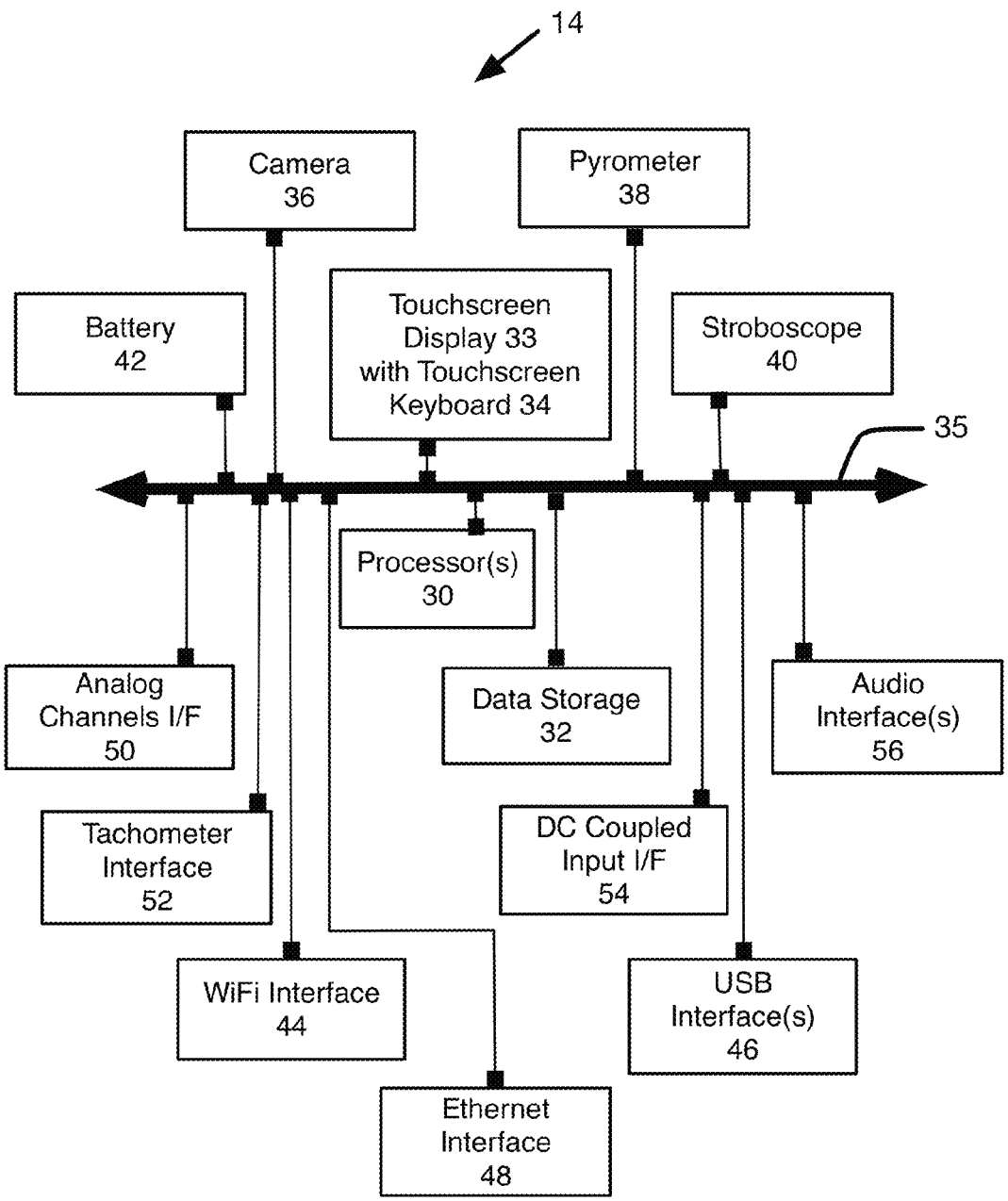
FIG. 2 is a block diagram of a handheld machine diagnostic data collection device according to an embodiment of this invention.

FIG. 2 shows a detailed block diagram of the handheld machine diagnostic data collection device 14 according to an embodiment of the present invention. The data collection device 14 is a portable unit held in hand by a technician or machine operator, and is used with or without being linked to the computing system 16. For example the data collection unit 14 is a single body unit to which sensor units, sensors and other devices may be connected using the interfaces included therein. A primary function of the device 14 is to collect data.

As part of the data collection process, a maintenance technician may carry or otherwise move the data collection device 14, including cables, if any, and sensors 18, 22 from machine to machine, such as in accordance with a preprogrammed "route." The route is a scheduled sequence of test points among a plurality of machines, and includes measurement prescriptions for each individual machine. A machine test point is any point on the machine, and need not be specially adapted for data collection. In some instances, however, a mounting stud may be affixed to the machine and left in place on the machine. The sensor unit 18 is removably mounted to the machine in such instances by being removably mounted and dismounted from the mounting stud.

Route information includes a list of machines from which data is to be collected, the identification of the test points for each machine, and the test point prescription (i.e., the setup instructions and parameters for each test point, and data collection procedure instructions). According to an embodiment of an invention herein, the instructions also include for some test points a standard graphic image or custom photograph showing the correct sensor positioning on the machine and the correct orientation of the sensor unit relative to the machine, (e.g., for properly aligning axes of a tri-axial sensor of an embodiment of the sensor unit 18). The data is collected from each machine 12 and stored in the data collection device 14. Local diagnosis is performed in some instances using data collected from for one or more test points of a machine. After data collection for the route, or for a machine, is complete, the stored data is downloaded to a database at a depository computing system (e.g., a server) or at the computing system 16 for historical storage and analysis.

The data collection device 14 is configured to provide a processing environment 149 (see FIG. 3) executed under an operating system 150 with a user interface 151, such as per a Linux™ operating system, Windows™ operating system, a Mac-OS™ operating system, an IOS™ operating system, an Android™ operating system, or another proprietary or open operating system software architecture. In an alternative embodiment, a proprietary, minimalist, executive program serves as an operating system for embedded computing applications. Accordingly referring again to FIG. 2, the data collection device 14 includes computing components, including one or more processors 30, data storage 32 (e.g., random access memory or other volatile memory; read only memory, read/write memory, a flash drive, a hard drive, an optical disk drive, or other non-volatile memory), a display and an input device, (e.g., a touchscreen 15) communicating via a bus architecture 35 or other system hardware architecture. The touchscreen 15 may be configured to provide a touchscreen display 33 and a touchscreen keyboard 34. Alternatively, a dedicated display and separate keyboard component may be included in place of the touchscreen 15. A battery 42 or an external power source provides power to the data collection device 14. During an exemplary data collection activity, a rechargeable battery preferably serves as the power source.

The data collection device 14 also includes several embedded devices within its housing so as to be part of the same integral body without the need of connecting to the data collection device via one of the interface ports. In some embodiments a camera 36, a pyrometer, 38, and a stroboscope 40 are embedded. Openings 17, 19, 21, 23 in the housing are present for the camera lens, the stroboscope light source and sensor, and the pyrometer laser sight. The embedded camera 36 includes a flash, optics, an optical sensor and a data interface. In some embodiments a bar code reader (or other quick response (QR) code reader) is implemented using the camera 36. In some embodiments an infrared imaging module is included with the camera allowing the technician to also capture infrared images using the camera interface. In an example embodiment the embedded stroboscope 40 senses rotation speed of a machine part within a range of 30-15000 revolutions per minute (rpm) and a flash duration of 0.5 to 15°.

The embedded pyrometer 38 includes a laser sight, along with a pyrometer data interface for moving collected pyrometry data into storage 32 or to a communication interface (e.g., interfaces 44, 46, 48). The pyrometer 38 performs contactless temperature measurement at a location on the machine 12 upon which the laser sight impinges. In an example embodiment temperature is sensed with a one second time response and 95% emissivity within a range of 0° C. to 200° C. to an accuracy of +/−3° C. for ambient temperature, and with a resolution of 0.5° C. in a field of view of 5° at 50% (e.g., 4 cm target at 50 cm distance).

The data collection device 14 includes several interfaces. Among audio interfaces 56 are a microphone input interface for connecting a microphone for use by a technician to tag a data collection activity with an audio note or for recording machine sound. An output audio speaker or audio headset jack also is included for outputting recorded audio. In an alternative embodiment, in addition or instead, a microphone and audio speaker are embedded in the data collection device 14.

Also included are a Wi-Fi interface 44, one or more USB interfaces 46, and one or more Ethernet interfaces 48. Data is collected from wireless sensor unit 18 through the Wi-Fi interface 44. The collection device 14 communicates with the computing system 16 using the Wi-Fi interface 44, a USB interface 46, or the Ethernet interface 48. A USB stick device also may interface to the data collection device 14 by one of the USB interfaces 46.

Several wired interfaces also are included for collecting machine 12 data from a wired sensor 22. In an example embodiment, there are multiple analog channels provided by an interface 50, a tachometer interface 52 for being coupled by wire to a tachometer, and a dc coupled input interface 54. In an example embodiment up to four programmable analog signal inputs (e.g., channels) may be coupled to the device 14 through the analog channels interface 50. Various sensors 22 may be wired to the channels of this interface 50, such as an accelerometer, vibration sensor, velocity sensor, absolute displacement sensor, relative displacement sensor, electrical current sensor, voltage sensor, or another machine diagnostic data sensor. For a sensor 22 coupled to the data collection device 14 by the wired interface, the processor 30 provides a signal processing capability to sample the sensor 22. DC coupled inputs (e.g., −24 to +24 volts DC) also may be provided to the interface 54 from sensors coupled to a channel of the interface 50. For example, FIG. 1 depicts a sensor 22 being connected to the data collection device 14's wired interface(s) by a wire connection 26 formed by one or more wires, cables, or fibers.

Software modules are loaded into and stored in the data collection device 14 for configuring the processor 30, the display 33, and the data collection device 14 to implement a user interface; to provide access to setup, control and operation of the embedded devices (e.g., camera, pyrometer, stroboscope; QR reader, infrared module); and to setup, configure, and monitor data collection activities.

Figure 3:
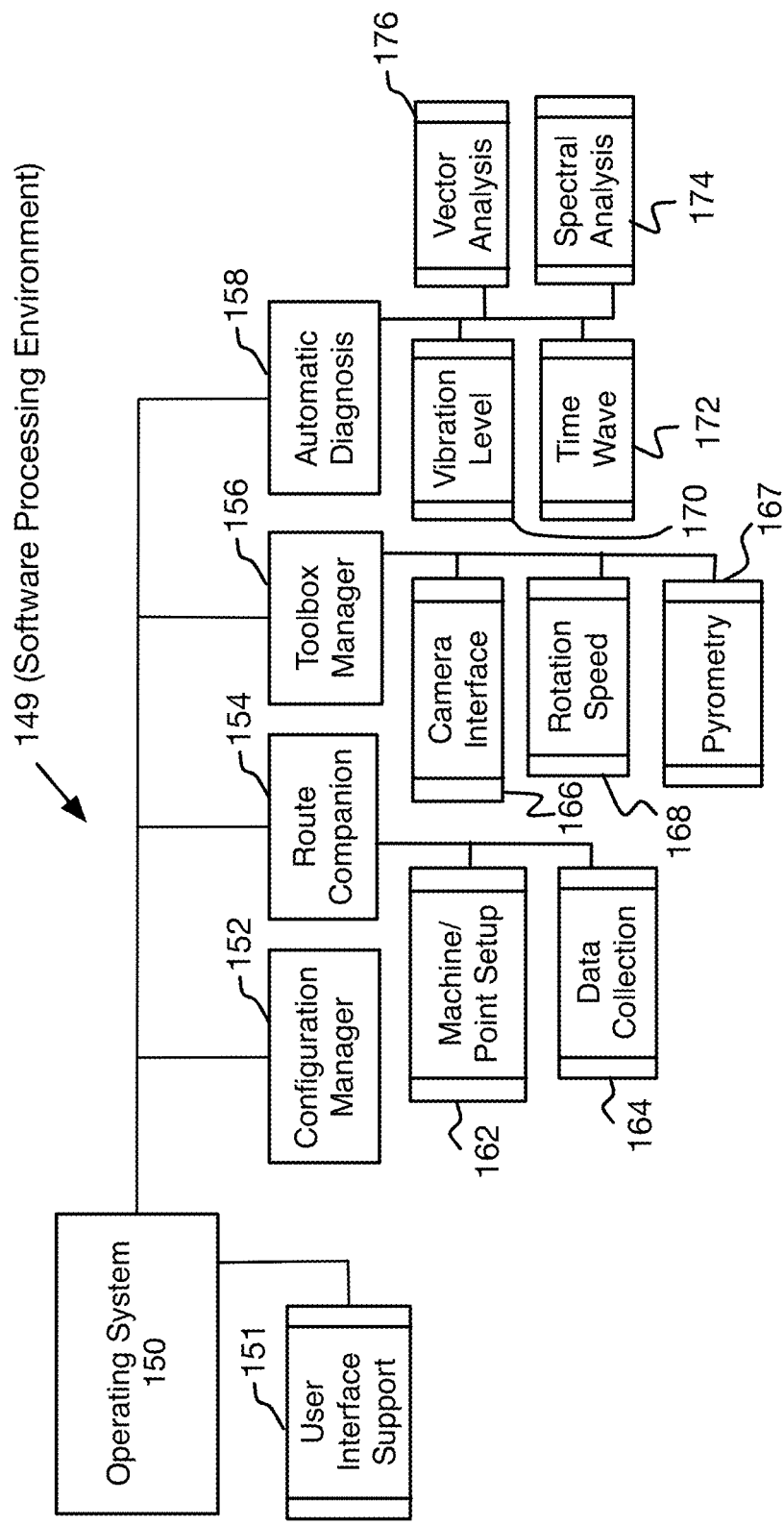
FIG. 3 is a diagram of the software process environment, which configures operation of the handheld machine diagnostic data collection device according to an embodiment of this invention.
Figure 4:
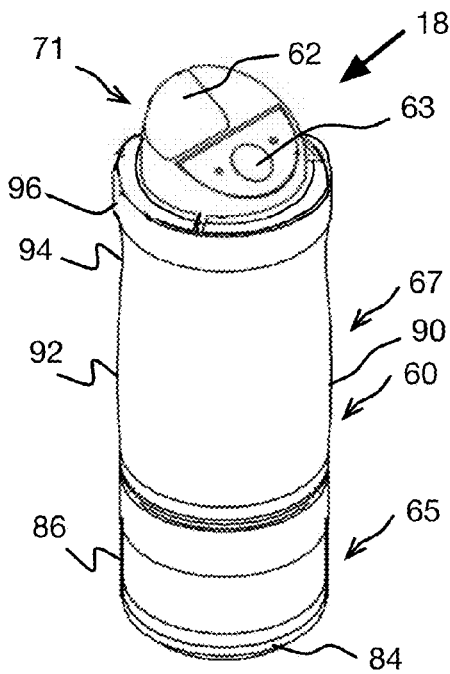
FIG. 4 is a perspective view of a machine diagnostic data sensor unit according to an embodiment of this invention.
Figure 5:
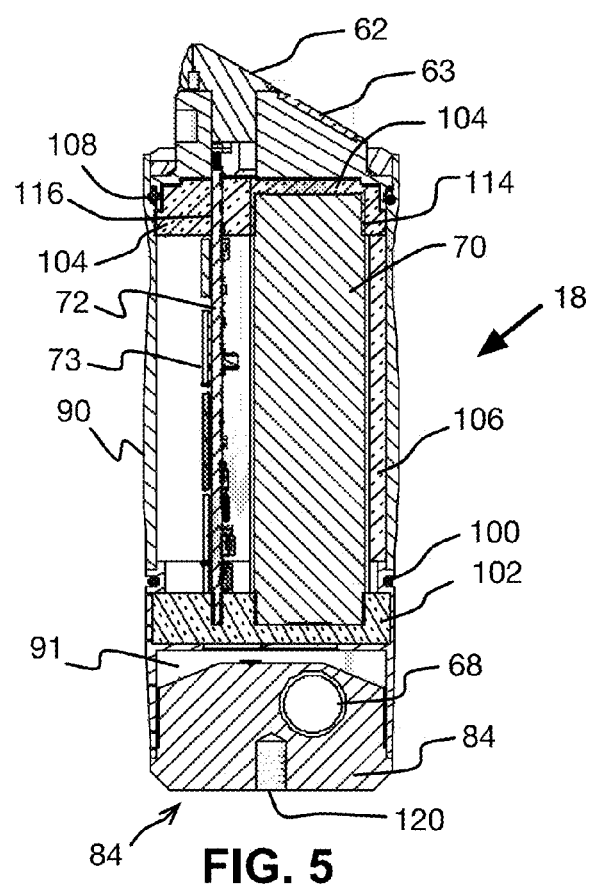
FIG. 5 is a sectional view of the machine diagnostic data sensor unit of FIG. 3.
Figure 6:
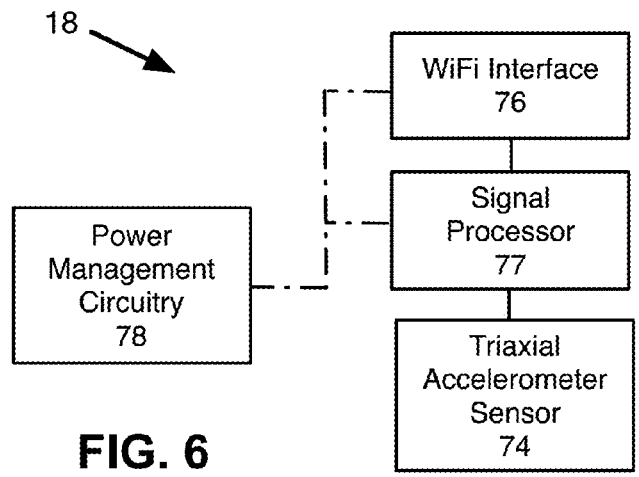
FIG. 6 is a block diagram of a machine, diagnostic data sensor unit electronics according to an embodiment of this invention.
Figure 7:
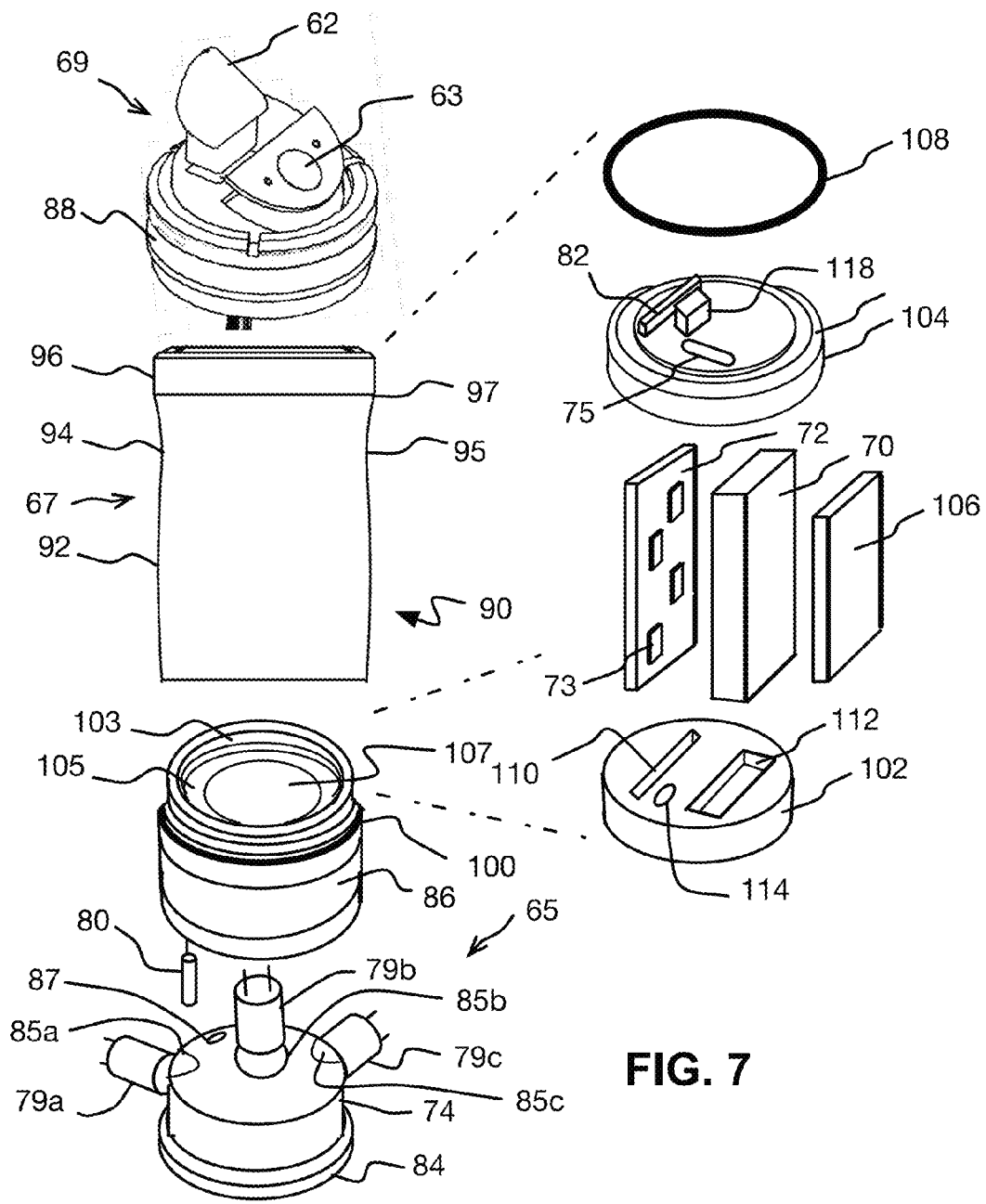
FIG. 7 is an exploded view of the machine diagnostic data sensor unit of FIG. 3-4.

FIG. 3 shows software modules according to an exemplary embodiment, including a configuration manager module 152, a route companion module 154, a toolbox manager 156, and one or more automatic diagnosis modules 158. The configuration manager 152 module is for configuring data collection routes. The route companion manager 154 is for use by the technician while performing a route, and includes machine/test point setup data modules and process modules 162, and data collection process modules 164. The processor 30 and display 33, as configured by a machine setup process, provide a sequence of measuring test points for the machine associated with the module, along with measurement prescriptions, setup instructions and parameters for each test point, and data collection procedure instructions.

The toolbox manager 156 includes sub-modules and processes for accessing and using the embedded devices, including one or more camera interface 166 sub-modules for operating the camera 36 and a rotation speed 168 sub-module for operating the stroboscope 40 to measure rotation speed using the laser sight. Also a pyrometer sub-module 167 provides pyrometer control for performing contactless temperature measurement by pyrometry using laser sighting. Other sub-modules also are included within the toolbox, such as for operating the camera as a QR code reader or for using an infrared hardware module of the camera. FIG. 1 shows openings 17, 19, 21, 23 at the front side of the housing of the data collection device 14 for the camera lens, laser sight, stroboscope, and pyrometer, respectively, for illustration purposes. In a preferred embodiment the openings 17, 19, 21, 23, instead are on the back side of the housing allowing the technician to view the touchscreen 15 while aiming the camera, laser sight, stroboscope and pyrometer at the machine 12.

Although the primary function of the data collection device 14 is data collection, processing of data also is performed in some embodiments. For example, in some embodiments automatic diagnosis modules 158 are loaded on the data collection device 14 and include a vibration level analysis module 170, a time wave analysis module 172, a spectral analysis module 174, and a vector analysis module 176. Each module configures the processor 30, the display 33, and the data collection device 14 to perform automatic diagnosis on collected data. Accordingly, in some embodiments automated diagnosis is performed on the spot at the time of data collection. The automated diagnosis modules configure the data collection device 14 to process diagnostic data collected from one or more test points of a machine to detect mass unbalance, misalignment, a mounting defect, moving part looseness, structural resonance, a lubrication defect, rolling element bearings defects (e.g., pitting, general wear), gear defects (e.g., tooth wear, broken tooth, backlash), and cavitation. The automated diagnosis modules configure the data collection device 14 to perform vibration analysis, temperature analysis, shock pulse measuring, spectrum analysis of shock pulse results, fast Fourier transform of vibration data, fault detection, tachometry, and other machine diagnostic and predictive maintenance analysis for one or more test points of one or more machines. Because automatic diagnosis may be performed during data collection or upon receipt of collected data, results of automatic diagnosis, including indication of alarms are available on the device 14 for each machine 12 right after the applicable data collection is performed.

The vibration analysis module(s) 170 perform high pass and low pass filtering, vibration velocity, rolling element detection shock pulse detection, and an alarm detection. The time wave analysis module 172 includes demodulation of time waveforms, sampling frequency selection, integration for determining, velocity, acceleration and displacement. The spectral analysis module 174 includes use of envelopes, zoom factors, different frequent ranges of analysis, weighting and synchronous analysis. The vector analysis module 176 includes vector measurements for different frequency ranges and includes synchronous averaging.

Once the technician completes the route, the technician will transfer all the data collected and processed by the data collection device 14 to the host computing system 16 where condition-monitoring software on the computing system 16 may perform additional diagnosis. For example, software loaded onto the host computing system 16 allows the computing system 16 to embody complementary analysis tools and post processing accessible to a user to perform machine diagnostic analysis. Also data received from several different data collection units 14 and other instruments are stored centrally on the host computing system 16 or another computing platform. Such data includes the data collected from the machine 12, along with processing results derived by the data collection device for processing performed during the route.

Machine Diagnostic Data Sensor Unit

FIGS. 4-7 show a wireless sensor unit 18, according to an embodiment of the invention, which communicates machine diagnostic data wirelessly to the data collection device 14. The sensor unit 18, as assembled, forms a single body unit that is removably mountable in its entirety at a test point location on a machine 12. Although the single body is formed in multiple parts, the exterior parts (i.e., forming the housing 60) are configured to provide a unitary-body look along the longitudinal length of the sensor unit 18. In particular joints between external parts (i.e., housings 86, 90) along the length of the sensor unit 18 are smooth so as to minimize adverse mechanical-body frequency response of the sensor unit 18. In some embodiments elastomeric O-rings 100, 108 are included proximal to respective joints of the single body to further improve frequency response of the sensor unit 18.

The sensor unit 18 includes a housing 60, an antenna 62, an on/off switch 63, a sensor 68, a battery 70, and a circuit board 72 with one or more circuit components 73 mounted thereon. The sensor 68 is located at the base of the sensor unit 18 so as to be as close as possible to the machine surface from which machine vibrations propagate into the sensor unit 18. In an example embodiment the battery 70 is a rechargeable lithium ion battery, which may be recharged through a USB interface 75 (see FIG. 7). The battery preferably has a capacity for a full days activity of data collection activity. Due to the presence of the rechargeable battery 70 and the presence of the circuit board 72 and circuit components 73 within the same body as the sensor 68, the sensor unit 88 weighs significantly more than a conventional wired sensor, and is significantly larger in size and weight. In an example embodiment, the sensor unit weighs 350-400 grams, has a longitudinal length of approximately 115 mm and a widest diameter of approximately 40 mm. Each of such size and weight are more than double the size and weight of a wired tri-axial accelerometer. Such increase in size and such increase in weight each alter the dynamic behavior of the sensor unit 18. For example, the battery 70 adversely impacts frequency response of the sensor unit above 7 kHz, which impact is offset by one or more elastomeric members according to an embodiment of the invention. Specifically, the sensor unit 18 as a whole is configured, as further described below, so as to have as good an accuracy and frequency response as a wired tri-axial accelerometer used for acquiring machine vibration data.

Machine diagnostic data is sensed from machine 12 by the sensor 68. In an example embodiment the sensor 68 is a tri-axial accelerometer 74 (see FIGS. 6-7) having a sensing component 79$a$, $b$, $c$ for each of three axes (x, y, z). In some embodiments the sensor unit 18 includes an additional sensor, such as a temperature sensor 80 (see FIG. 7). The sensors 68/74, 80 are connected to the circuit board 72. Sensor data is sampled from the sensors by a signal processor 77. The signal processor 77, along with data storage circuits, power management circuitry 78, a Wi-Fi interface 76 component, and other circuits are mounted or connected to the circuit board 72. The signal processor 77 controls and manages collection, buffering, storage, and transmission of sensor. The Wi-Fi antenna 62 is coupled to the Wi-Fi interface 76 at a connector 82, and radiates a Wi-Fi signal to the data collection device 14 as per signals and signal contents determined by the signal processor 77 and/or Wi-Fi interface 76.

In an example embodiment the wireless tri-axial accelerometer sensor 74 provides 3-axis synchronous acquisition with a 20 kHz bandwidth on each axis (i.e., x, y, and z-axes) within a 3 db frequency range (e.g., 15 kHz (z-axis) 6 kHz (x-axis and y-axis) and an 80 dB signal to noise ratio; and exhibits an accuracy of +/−3%. In a specific embodiment full-scale accelerometer detection is rated at 80$g$. The bandwidth, signal to noise ratio, accuracy and other performance specifications may vary in other embodiments.

Periodic machine diagnostic data collection of vibration data using the portable handheld data collection device 14 in the context of predictive maintenance implies a full day of measurement activity among several machines in a factory. Thus, it is important that the wireless sensor unit 18 have a sufficient battery lifetime to serve a full day of measurement activity. Accordingly, the battery 70 preferably is rechargeable and preferably has a lifetime between charges of approximately 8 hours or greater (1 day of measurement activity) is used.

In contrast to a sensor that (i) is permanently affixed to a single test point location of a single machine, (ii) is dedicated to collecting data from that single test point location, and (iii) has its sensor output sampled by a separate device electrically coupled by a cable or other wired connection— the sensor unit 18 instead is configured to be removably mounted to various test point locations at various machines of the same or different machine type and to provide a wireless communication capability. Of significance is that the entire sensor unit 18 is removably mounted to the machine 12 at a given test point location. Accordingly, the Wi-Fi transmitter 76, the signal processor 77, the data storage circuits, the power management circuitry 78, the battery 70, and other circuits mounted or connected to the circuit board 72 are subjected to the machine vibrations. Further the battery capacity requirement for the sensor unit 18 is greater than for a simple wired sensor lacking a transmitter due to the many components being powered.

Locating the circuits within the sensor unit 18 housing and including the weight of a preferred battery affects the dynamic behavior of the sensor unit 18. Vibrations occur at multiple frequencies and amplitudes based on the vibrations from the source and the effects added by the path along which the vibrations propagate. Energy losses occur within the materials along which the vibrations propagate, and at each boundary across which the vibrations traverse. The vibration gets reflected in part by the boundary resulting in vibrations propagating along many paths. Accordingly, the geometrical configuration of the sensor unit and its components, along with the material properties of each component affect how the sensor unit mechanically responds to the machine vibrations. Such mechanical response impacts the vibrations detected by an accelerometer or other vibration sensor of the sensor unit. One challenge caused by the added volume and mass (e.g., weight of the battery, the size of the battery, and the space requirements for the circuit board, circuits, and antenna) is that the vibration subjected to the sensor unit 18 by the machines 12 over the sensor unit 18 lifetime may cause the electronic components to fail earlier. Another challenge is that the added mass and volume in comparison to a wired sensor lacking such added components can adversely impact the frequency response of the sensor unit 18. Such adverse frequency response can alter the accuracy of the sensor 68/74 readings. Accordingly, the mechanical construction of the sensor unit 18 is significant for enabling effective performance of the sensor unit 18 as a wireless device removably mounted to a machine 12. In particular, the added mass and volume pose a challenge in achieving a frequency response as good as that of the smaller lighter-weight wired accelerometers used for measuring machine vibration.

In an example embodiment, the desired frequency response of the sensor unit 18 is the same as for a wired sensor. In a preferred embodiment the sensor unit has a frequency response rating of no more than +/−3 db at 12 kHz or greater on a z-axis and no more than +/−1 db at 5 kHz or greater on a z-axis. In use on a machine, when mounted using a simple stud accessory (See FIG. 8), the frequency response achieved is preferably no more than +/−3 at 12 kHz or greater on a z-axis and no more than +/−1 db at 5 kHz or greater on a z-axis. When mounted using a magnetic stud accessory (See FIG. 9) a frequency response preferably is no more than +/−3 at 2 kHz or greater on a z-axis is achieved. The z-axis refers to the axis of the z-axis accelerometer component 79c of the tri-axial accelerometer 74. The frequency response of the sensor unit 18, as referred to herein, is the vibration introduced by the sensor unit 18 (as a physical body) in response to external vibrations experienced by the sensor unit 18. To be in compliance with such exemplary frequency response requirement the sensor unit 18, when exposed to machine vibrations, can alter those machine vibrations (as measured by the sensor 74) due to the sensor unit's own mass and volume by no more than the rated db level at the specified frequency.

Using dynamic material analysis methodologies and finite element modeling, parts of the sensor unit 18 adversely affecting a desired frequency response of the sensor unit as a whole were identified. Specifically, such methodologies and modeling are used to measure frequency response of components and of the sensor unit 18 as a whole so as to determine compliance with the desired frequency response of the sensor unit. Parts having an adverse contribution to the frequency response were modified so that local portions of the sensor unit 18 are stiffer and other portions have added damping. In a preferred embodiment elastomeric materials are used for damping, so as to enable the sensor unit 18 to achieve the frequency response at high frequencies under operational temperature conditions of the sensor unit 18 environment. The elastomeric material exhibits a desirable damping factor and material modulus. Specifically, the elastomeric materials have a Young's modulus of $3e^7$.

There are several features of the mechanical construction that benefit the frequency response performance of the sensor unit 18. As used herein proximal is the relative direction toward the sensor unit base (and the machine), and distal is the direction toward the sensor unit cap member and antenna (and away from the machine), along the longitudinal length of the sensor unit 18. One of such features includes enhancing rigidity at a distal portion of the sensor unit 18 in a region of a joint between an upper housing 90 and a cap member 88. Note the profile of the distal portion of housing 90.

Another of the features benefiting the frequency response performance is an elastomeric member 102 included for vibrationally decoupling (in part) the sensor 68/74 from the battery 70 and electrical circuit board 72, and for damping vibrations to which the circuit board 72 and battery 70 are exposed. (See FIG. 5.) Still another of the features benefiting the frequency response performance is the inclusion of an elastomeric pad 106 along a face of the battery 70 between the battery and the housing 90.)

In an example embodiment the sensor unit 18 is formed in three compartments: a base portion 65, a middle portion 67 and a cap portion 71. The base portion houses the sensors 68/74, 80. The middle portion houses the circuit board 72, electrical components 73, and battery 70. The cap portion includes the Wi-Fi antenna 62 and the on-off switch 63. A limited degree of decoupling is provided between the base portion and middle portion 67 internal components (e.g., circuit board 72, battery 70, Wi-Fi interface 68, signal processor 77), and also may be provided between the middle portion 67 internal components and the cap portion 71.

The base portion 65: The sensor 68/74 is located within a base component 84 of the sensor unit 18. The base component 84 is surrounded, concentrically, by a hollow, cylindrical housing 86. In an example embodiment the housing 86 and base component 84 each are made of stainless steel, although another rigid, durable material suitable for industrial application may be used in other embodiments. A bottom surface of the base component 84 is the bottom of the sensor unit 18. The base component 84 includes openings 85a, 85b, 85c, 87 into which respective sensor components 79a, 79b, 79c, 80 may reside. The size of each opening is prescribed according to the sensor dimensions so as to provide a tight fit for the sensing components 79 and sensor 80.

Cap portion 71: The antenna 62 and the on-off switch 63 are located in a cap member 88. In alternative embodiments the on-off switch 63 and/or antenna 62 may be located at another portion of the sensor unit 18. The cap member 88 fits into an opening at a top end of the middle portion 67 of the sensor unit 18. An elastomeric O-ring 108 serves as a damping body providing damping of vibrations propagating from each one of the cap portion 71 and middle portion 67 to the other of the cap portion 71 and middle portion 67. In particular, the O-ring provides damping between the cap member 88 and the housing 90 at the joint (i.e., at the abutting parts of the cap member 88 and housing 90.

Middle portion 67: The middle portion 67 includes a hollow cylindrical housing 90 which concentrically surrounds the battery 70 and the circuit board 72, including the signal processor 77, and one or more components of the Wi-Fi interface 76 (i.e., component(s) other than all or a portion of the antenna 62). In an example embodiment the housing 90 is made of stainless steel, although another rigid, durable material suitable for industrial application may be used in other embodiments.

To achieve a desired rigidity, the housing 90 has a curved profile along its longitudinal direction, so as to provide a convex profile length 92 along a first longitudinal portion of the housing 90 and a concave profile length 94 along a second longitudinal portion of the housing. The housing 90 also includes a third length 96 at a first end of the housing, which length 96 has a straight profile relative to the longitudinal axis or an angled profile relative to the longitudinal axis of the housing 90. The convex profile length 92 is the longest of the three lengths 92, 94, 96. The shorter concave profile length 94 is between the convex profile length 92 and the straight or angled length 96.

To enhance rigidity at the distal portion of the sensor unit around the joint between the upper housing 90 and a cap member 88, a length along the housing 90 from a maximum trough depth 95 of the concave profile length 94 to the start 97 of the straight/angled length 96 is relatively short, (e.g., less than 25% of the housing 90 length; preferably less than 20% and more preferably 5-15%). Further a length along the housing 90 from a maximum trough depth 95 of the concave profile length 94 to the distal end of the housing 90 is less than 40% of the longitudinal length of the housing 90, and preferably 15-35% of the longitudinal length of the housing 90. In a preferred embodiment the straight profile length (or angled profile length) 96 is 5-20% of the longitudinal length of the housing 90. In an example embodiment the length along the housing 90 from the maximum trough depth 95 of the concave profile length 94 to the distal end of the housing 90 is approximately 25% of the longitudinal length of the housing 90, and to the start 97 of the length 96 is approximately ⅛ or 12.5% of the total longitudinal length of the housing 90

The housing 90 is secured to the base component housing 86. Decoupling of the base component 84 from the housing 90 and the circuit board 72 and battery 70 is achieved to a limited extent by including a space 91 between the base component 94 and an elastomeric seat member 102. Decoupling also is aided by including an elastomeric O-ring 100 in the region of the connection between the base component's housing 86 and the middle portion's housing 90. The O-ring 100 provides damping for improved vibrational impedance matching at the joint between the base component housing 86 and the housing 90, so that less noise is introduced by vibrations passing from the base component and base component housing 86 to the middle portion and the housing 90.

Damping within the sensor unit 18 is achieved using various damping bodies. As described above the O-rings 100 and 108 serve as damping bodies. Elastomeric members 102, 104 and elastomeric pad 106 also serve as damping bodies. The elastomeric members 102, 104 and pad 106 are made of an elastomeric material, and in an example embodiment have a Young's modulus of 3e$^7$. The O-rings 100, 108 may be formed of the same or a different elastomer than the members 102, 104, and pad 106.

Elastomeric member 102 is situated at the top of the base component housing 86 and is secured in place between an upper lip 103 and a shelf 105 of the housing 86. (See FIG. 7). The shelf 105 includes a central opening 107. The underside of the elastomeric member 102 is supported by the shelf 105 and is open to the space 91 in the area of the opening. Recesses 110, 112 are formed in the elastomeric member 102 and serve as a female receptacle for receiving the lower end of the circuit board 72, and battery 70, respectively. Accordingly, the end of the circuit board 72 fits snugly into the recess 110 and the end of the battery fits snugly into the recess 112, so that the elastomeric member 102 serves as a seat for the ends of the circuit board 72 and battery 70. Machine vibrations propagating though the base component 84 to the housing 86 including the lip 103 and the shelf 105 are dampened by the elastomeric member 102 reducing the amplitude of vibrations propagating to the battery 70, the circuit board 72, and the components mounted to the circuit board 72 from the base component housing by way of the elastomeric member 102. Thus, the vibrations propagating to the Wi-Fi interface 76, the signal processor 77, the data storage circuits, the power management circuitry 78, and other circuits via such path are reduced. The elastomeric member 102 also includes an opening for through which wire(s), conductive member(s), or other connecting member(s) pass to electrically couple the sensor 68/74 (e.g., sensor parts 79a, b, c) and/or sensor 80 to the circuit board 72. The elastomeric member 102 forms a tight fit around such wires to also provide damping of vibrations propagating along the wires to the circuit board 72.

Elastomeric member 104 is situated at the top of the housing 90. A recess 114 at the underside of the forming member 104 extending upward serves as a female receptacle for receiving the upper end of the battery 70. Accordingly, the end of the battery 70 fits snugly into the recess 114. An opening 116 all the way through the thickness of the elastomeric member 104 serves as a female receptacle, which receives an upper end of the circuit board 72. In some embodiments the end of circuit board 72 protrudes through the opening 116. In other embodiments a circuit board connector 82 at the end of the board extends through or is positioned at the opening 116 at the upper side of the forming member 104. The antenna 62 and an actuator 118 of the on-off switch 63 are electrically connected to the circuit board 72. A through opening for a USB port 75 used for charging the battery 70 also is located in the forming member 104. Machine vibrations propagating though the housing 90 and cap member 88 are dampened by the elastomeric member 104 reducing the amplitude of vibrations incurred to the battery 70, the circuit board 72, and the components mounted to the circuit board 72, such as the Wi-Fi interface 76, the signal processor 77, the data storage circuits, the power management circuitry 78, and other circuits.

Elastomeric pad 106 is situated in contact with the battery 70 along a longitudinal face of the battery 70 between the battery 70 and the housing 90. The pad 106 is sized to cover the entire face of the battery other than that portion of the face covered by the forming members 102, 104 (i.e., the parts of the face within the recesses 112, 114). Accordingly, damping body material covers at least one entire face of the battery 70. The pad 106 provides additional damping beyond that provided by elastomeric members 102, 104 at each end of the battery 70, thereby improving the frequency response of the bulky weighty battery component and of the sensor unit 18 overall.

Sensor Mounting and Dismounting

In an exemplary embodiment the sensor unit 18 includes a female-threaded opening 120 (see FIG. 5) within the base component 84 for receiving a threaded male stud of a mounting accessory. In other embodiments the male and female positions may be reversed. In still other embodiments different structures may be provided for securing a mounting accessory to the sensor unit 18. In still other embodiments, the mounting structure may instead be formed as an integral part of the base component 84 or of the sensor unit 18.

Figure 8:
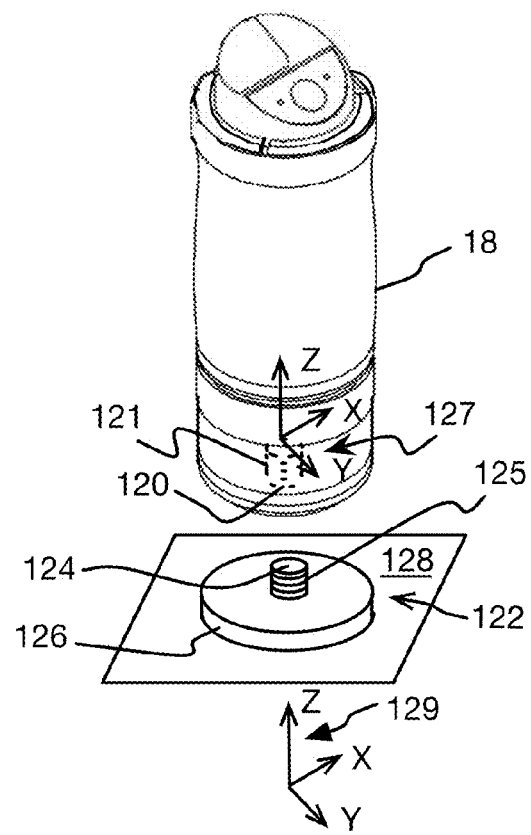
FIG. 8 is a perspective view of the sensor unit and a mounting stud attached to a machine onto which the sensor unit is to be mounted.

In one embodiment a simple stud accessory 122, as shown in FIG. 8, serves as the mounting accessory. The stud accessory 122 includes a threaded male stud 124 extending from a base plate 126, which screws into the female threaded opening 120 of the sensor unit 18. The stud accessory 122 may be permanently mounted (e.g., glued) at a machine 12 such as to a mounting plate or directly to a housing 128 of the machine. The sensor unit 18 is screwed onto the threaded male stud at the machine to mount the sensor unit at the test point location defined by the location of the stud accessory 122 on the machine. The sensor unit is dismounted by unscrewing the sensor unit 18.

In a preferred embodiment the female threaded opening 120 has a thread 121 indexed to the 3 axes 127 of the tri-axial accelerometer 74. The thread 125 of the male stud 124 and the thread 121 of the female threaded opening 120 are configured so that when the sensor unit 18 is screwed onto the simple stud accessory 122 to an end of travel along the thread 125, a known repeatable prescribed positioning is achieved between the tri-axial accelerometer 74 (and thus the x-axis, y-axis and z-axis of the tri-axial accelerometer) and the simple stud accessory 122 for any sensor unit 18 having a tri-axial accelerometer 74. Each stud accessory 122 is permanently mounted on a given machine 12 in a planned, desired position, so that when any sensor unit 18 is mounted at such machine by screwing onto the accessory 122, the x-axis, y-axis, and z-axis of the accelerometer 74 are in alignment with a prescribed axes 129 (i.e., x-axis, y-axis, and z-axis) of a part of the machine. Thus, every time the sensor unit 18 is mounted the axes 127 of measurement of the sensor 74 are already aligned with the desired axes 129 of measurement for the machine. Further, even when a different specimen of the sensor unit 18 is mounted the axes 127 of measurement of the sensor are already aligned with the axes 129.

Figure 9:
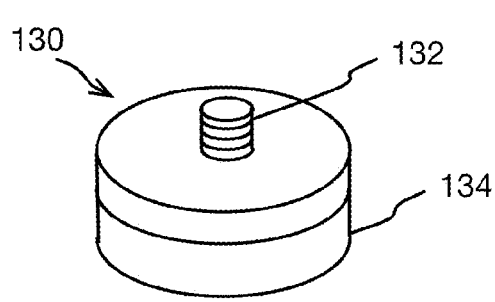
FIG. 9 is a perspective view of a magnetic mounting device for use in magnetically holding the sensor unit to a machine.

In another embodiment a magnetic stud accessory 130, as shown in FIG. 9, serves as the mounting accessory. The magnetic stud accessory includes a threaded male stud 132 extending from a body 134, which screws into the female threaded opening 120. In various embodiments the body 134 is a magnet or has one or magnets at its base. A flat magnet is effective for mounting the sensor unit 18 to a flat surface, such as a mounting plate of a machine 12. A bipolar magnet, such as a pair of magnets at a base of the body 134 is effective for mounting the sensor unit 18 to a curved surface of a machine 12.

For stud accessory 122 the circumferential, proximal-end location of the thread of the male threaded stud 124 is aligned on machine surface 128 so that when the sensor unit is fully screwed onto the stud 124, the sensor unit 18 achieves a repeatable known prescribed positioning for the x, y, and z-axes of sensor 74. For stud accessory 130 there is no corresponding control for assuring repeatable orientation of the sensor 74 axes relative to the machine 12. (See the method of linking a photograph to a test point location for using the photograph to aid the technician in properly positioning and orienting the sensor unit, which method is particularly useful when such a magnetic stud accessory 130 is used).

Figure 10:
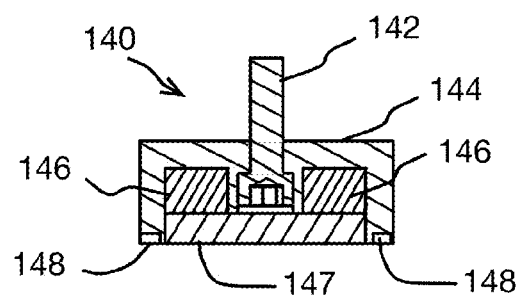
FIG. 10 is a sectional view of an indexed magnetic mounting device for use in magnetically holding the sensor unit to a machine.

In some embodiments an indexed magnetic stud accessory 140, as shown in FIG. 10, serves as the mounting accessory. The indexed magnetic stud accessory 140 includes a threaded male stud 142 extending from a body 144, and one or more magnets 146. The male stud 142 screws into the female threaded opening 120. The body 144 also includes an indexing positioning mechanism, such as one or more notches 148 at its base. One or more cementing pads 147, which are not integral to the stud accessory 140 are permanently mounted (e.g., glued) at measurement locations on a machine 12. When the sensor unit 18, together with stud accessory 140, is mounted to the machine, the cementing pad(s) 147 fit into the notches of body 144. Such indexing provides a control technique for assuring repeatable orientation of the sensor 74 axes relative to the machine 12.

Data Collection Method and Operation

The sensor unit 18 and the data collection device 14 are used to perform operational methods for implementing data collection and local data diagnosis, according to an embodiment of the invention. In some embodiments the data collection device 14 includes multiple processors 30 configured to perform parallel processing, so as to perform data collection and local data diagnosis processing together in real time. As a benefit, the collection device 14 provides immediate automatic display of collection/measurement progress at a current test point location and of local processing results. The data collection device 14 is configured in some test point collection applications to manage data collection and local data diagnosis of data received from the wireless sensor unit 18, from a wired sensor 22 (e.g., a wired tri-axial accelerometer), or from 4 synchronous channels (via channels 50) from 4 single-axis wired accelerometers. For example, at one test point location of a given machine 12, data may be collected using the sensor unit 18. As part of the same route where data also is collected from another test point location on the same machine, data collection is performed in an exemplary embodiment using the wired sensor 22. Such wired sensor 22 may be a tri-axial accelerometer. At still another test point location for the same machine during the same route, data is collected by the data collection device 14, simultaneously from 4 synchronous channels (via channels 50) from 4 single-axis wired accelerometers. At other test points, others types of machine diagnostic sensors may be used for measuring and collecting machine diagnostic data (via any of the interfaces 44-56). Accordingly, during performance of any given route, the data collection system may be configured to collect data using the data collection device 14 together with any one or more of the sensor unit 18, the wired sensor 22, or other sensors coupled to the data collection device 14 through any of the device 14 interfaces 44-56.

A user interface of the data collection device 14 is implemented in software for controlling the display 33 and responding to user inputs to enable data collection and overall operation of the data collection device 14. A technician can access a toolbox interface (e.g., toolbox module 156) to access and operate the embedded camera 36, bar code scanner, infrared module, pyrometer 38, and strobo-scope 40.

The technician can access the configuration manager module 152 to access, edit, and add to a database for configuring a machine diagnostic data collection route. Although a technician normally will execute a predetermined route, the technician also may perform data collection off-route. The configuration manager module 152 is used to configure the data collection device 14 to monitor the off-route activities and compile the activities to record a route from the off-route activities. Alternatively, the technician may create a route by accessing setup data modules pertaining to different machines or portions thereof pertaining to respective test points. Thus, pull together a new route from one or more pre-existing routes stored on the data collection device by picking and choosing among machines in a facility, and ordering test point locations on respective machines. In some embodiments, the technician can modify a copy of an existing route stored on the data collection device 14.

Figure 11:
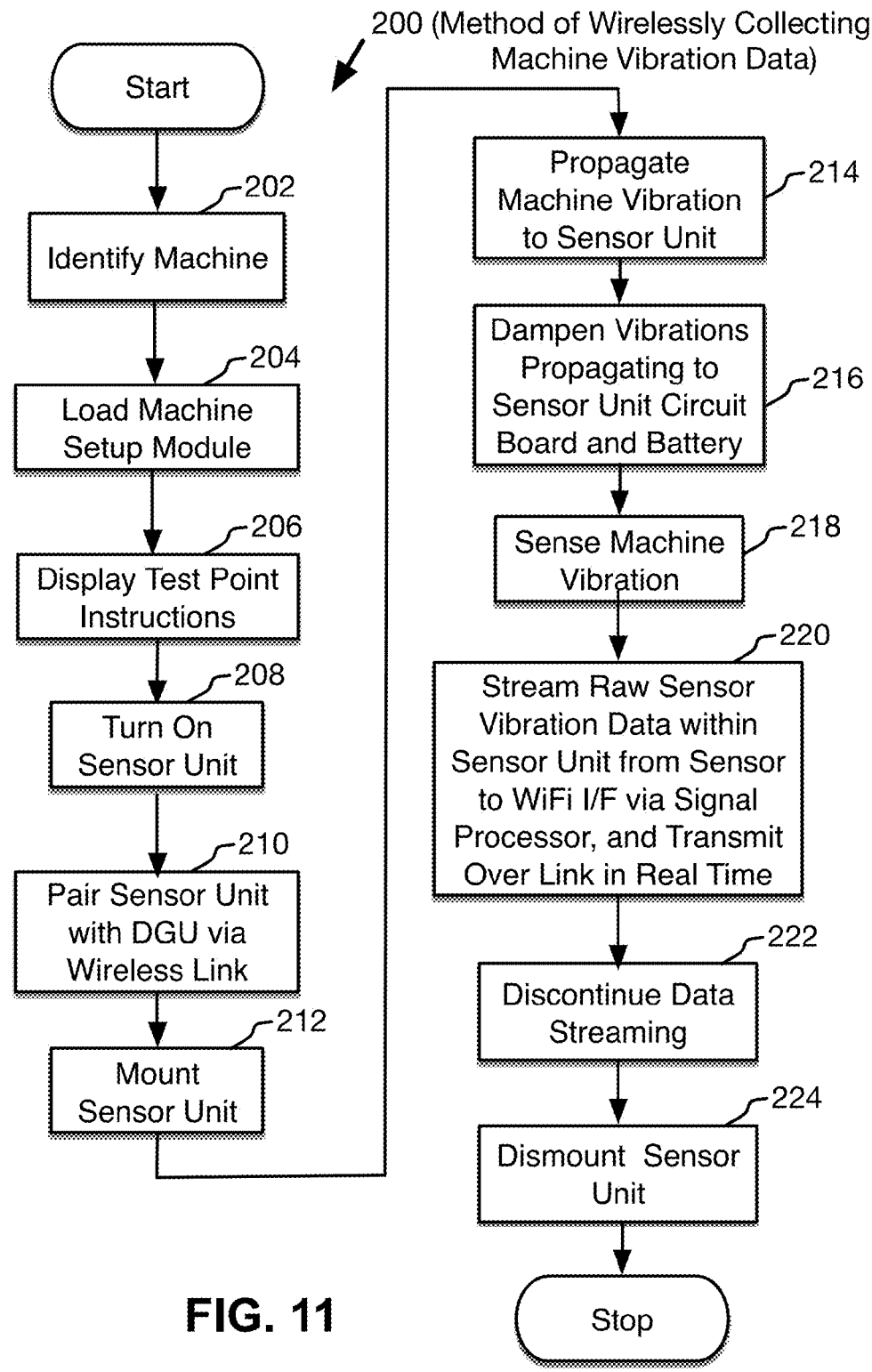
FIG. 11 is a flow chart of a method for wirelessly collecting machine diagnostic data using the sensor unit and handheld machine diagnostic data collection device.

Operation of the data collection device 14 and sensor unit 18 during performance of a route is now described. FIG. 11 is a flow chart of a method 200 of collecting sensor data wirelessly according to an embodiment of the invention. With the data collection device 14 turned on, a technician accesses the route companion module 154 via the user interface 151 to select a route to perform. The route is loaded for access by the processor 30. The route includes a list of machines and for each machine includes a list of test point locations, and for each test point location, includes a test point prescription—test point data setup instructions, test point parameters, and test point measurement/collection instructions.

In some embodiments, the technician will approach a machine 12 in the facility with the data collection device 14 in hand and use the QR code reader to scan the QR code of the machine 12 at step 202. A machine corresponding to the QR code is identified by the processor 30, and an indication is displayed to inform the technician as to whether the identified machine is the current machine on the preconfigured route for which data is to be collected. If correct, then the machine/point setup process 162 is executed by the processor 30 at step 204. If the identified machine is incorrect, the technician may scan another machine's QR code to find the correct machine or override the order of machines in the route and enter a command to collect data for the identified machine (when part of the route).

Figure 12:
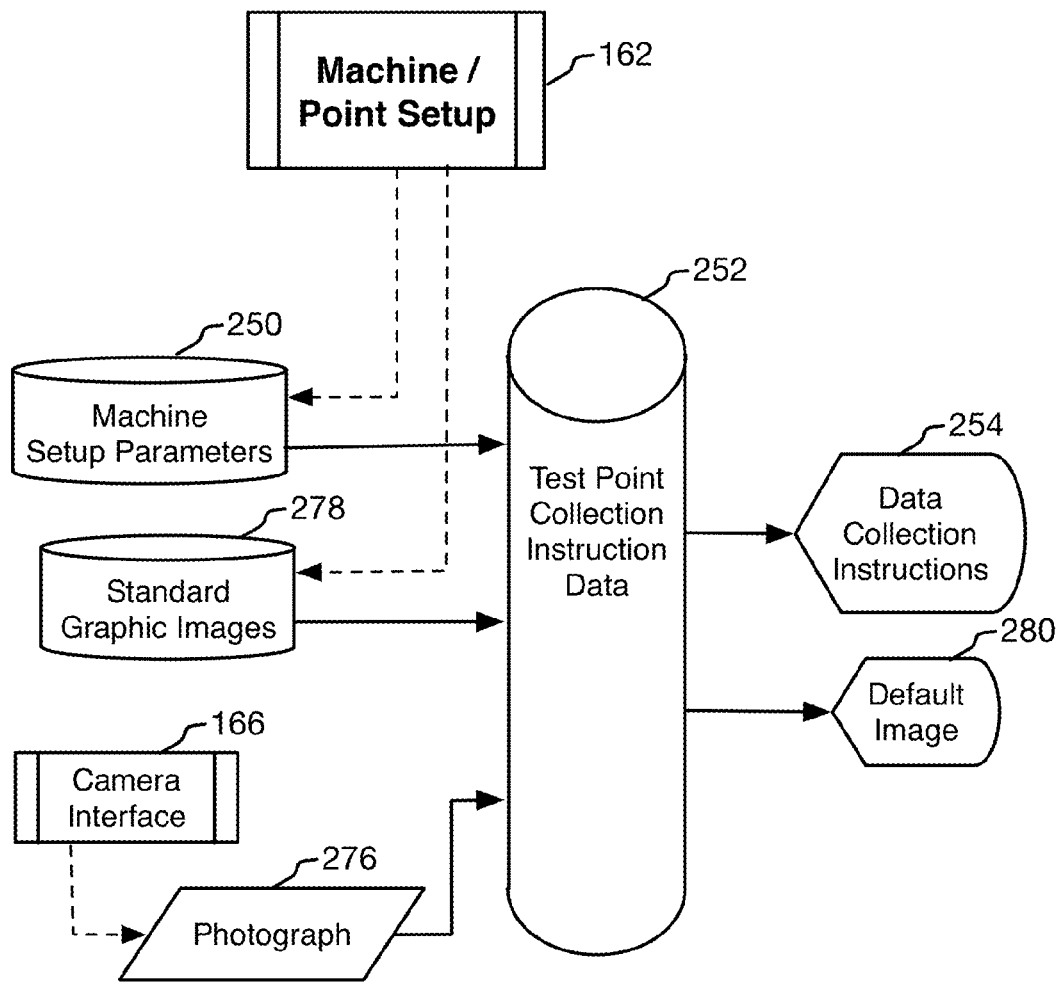
FIG. 12 is a data and control diagram of the machine/test point setup process of the data collection unit.

FIG. 12 shows a data and control flow diagram of the machine/point setup process 162 for preparing to collect data at a machine test point. The machine/point setup process 162 accesses the machine setup data 250 to form a table 252 or other data construct of the test point data collection instruction related data. At step 206 instructions 254 are displayed on display 33 for a current test point of the current machine on the route.

At step 208, if the sensor unit 18 is not yet turned on, the sensor unit 18 is turned on. In various embodiments, the sensor unit 18 is mounted at any time before or after the sensor unit 18 is mounted. At step 210, the sensor unit 18 and data collection device 14 establish a wireless Wi-Fi communication link 150. When the data collection device 14 is powered on and is within communication range of a sensor unit 18 that also is powered on, the Wi-Fi interface 44 scans the communication field for a linking signal from the sensor unit 18 according to a Wi-Fi communication protocol. At the sensor unit 18, when it is turned on at on-off switch 63, the signal processor 77 instructs the Wi-Fi interface 76 to commence the wireless protocol for linking the sensor unit 18 to the data collection device 14. Data communications between the sensor 18 and data collection device 14 have a range extending to 10-20 meters depending on the noise in the environment affecting wireless communication. The specific linking time and distance range may vary in differing embodiments. Preferably, the data collection device 14 automatically detects the presence of the sensor unit 18 within approximately 30 seconds resulting in linking of the sensor 18 and the data collection device 14. In some embodiments, the linking protocol is for pairing the data collection device 14 with one sensor unit 18 at a given time. During communications, disturbances or other interruptions to a data transfer are managed so that no data is lost. In particular when the data collection device 14 wireless interface 44 detects a dropped packet (or other unit of communication) for the link 150 between the sensor unit 18 and data collection device 14, the wireless interface 44 automatically sends a command to the sensor unit wireless interface 68 to resend the missing packet or a sequence of packets or the entire data collection measurement that was commanded by the data collection device 14—as per the wireless communication protocol.

At step 212 the technician mounts the sensor unit 18 at a specific test point location on the machine 12, as indicated by the instructions displayed pertaining to the test point. In some embodiments the machine to which the sensor unit 18 is removably mounted is turned off before mounting the sensor unit 18, then is turned back on once the sensor unit has been mounted. In other embodiments the machine is on and either running in a standby mode or operational mode while the sensor unit 18 is being mounted. Once the sensor unit 18 is mounted, the machines vibrations propagate into the sensor unit 18 (at step 214) due to the physical contact between the sensor unit 18 and the machine 12—either directly or via a mounting accessory. While exposed to such vibrations, the sensor unit's elastomeric members 102, 104, and pad 106 dampen the amplitudes of vibrations passing through such members at step 216 so that the sensor unit 18 as a mechanical body alters the vibrational dynamics attributable to the machine vibrations by no more than as for a conventional wired sensor. In a best mode embodiment, the sensor unit 18 as a mechanical body alters the vibrational dynamics attributable to the machine vibrations by no more than +/−3 db at 15 kHz on a z-axis and no more than +/−1 db at 10 kHz on a z-axis when mounted using a simple stud accessory. In a preferred embodiment, the sensor unit 18 as a mechanical body alters the vibrational dynamics attributable to the machine vibrations by no more than +/−3 db at 12 kHz on a z-axis and no more than +/−1 db at 5 kHz on a z-axis when mounted using the simple stud accessory. In a preferred embodiment, the sensor unit 18 as a mechanical body alters the vibrational dynamics attributable to the machine vibrations by no more than +/−3 db at 2 kHz on a z-axis when mounted using a magnetic stud accessory. In still other embodiments of the present invention, vibration data is collected by the sensor unit 18 with the sensor unit 18 as a mechanical body altering the vibrational dynamics attributable to the machine vibrations by no more than +/−3 db at 2 kHz and higher frequencies within the machine vibration frequency spectrum, or +/−3 db at 5 kHz and higher frequencies within the machine vibration frequency spectrum, or +/−1 db at 5 kHz and higher frequencies within the machine vibration frequency spectrum, on any sensing measurement axis of the sensor for any type of mounting method and/or mounting accessory used to mount the sensor unit 18 to the machine.

Figure 13:
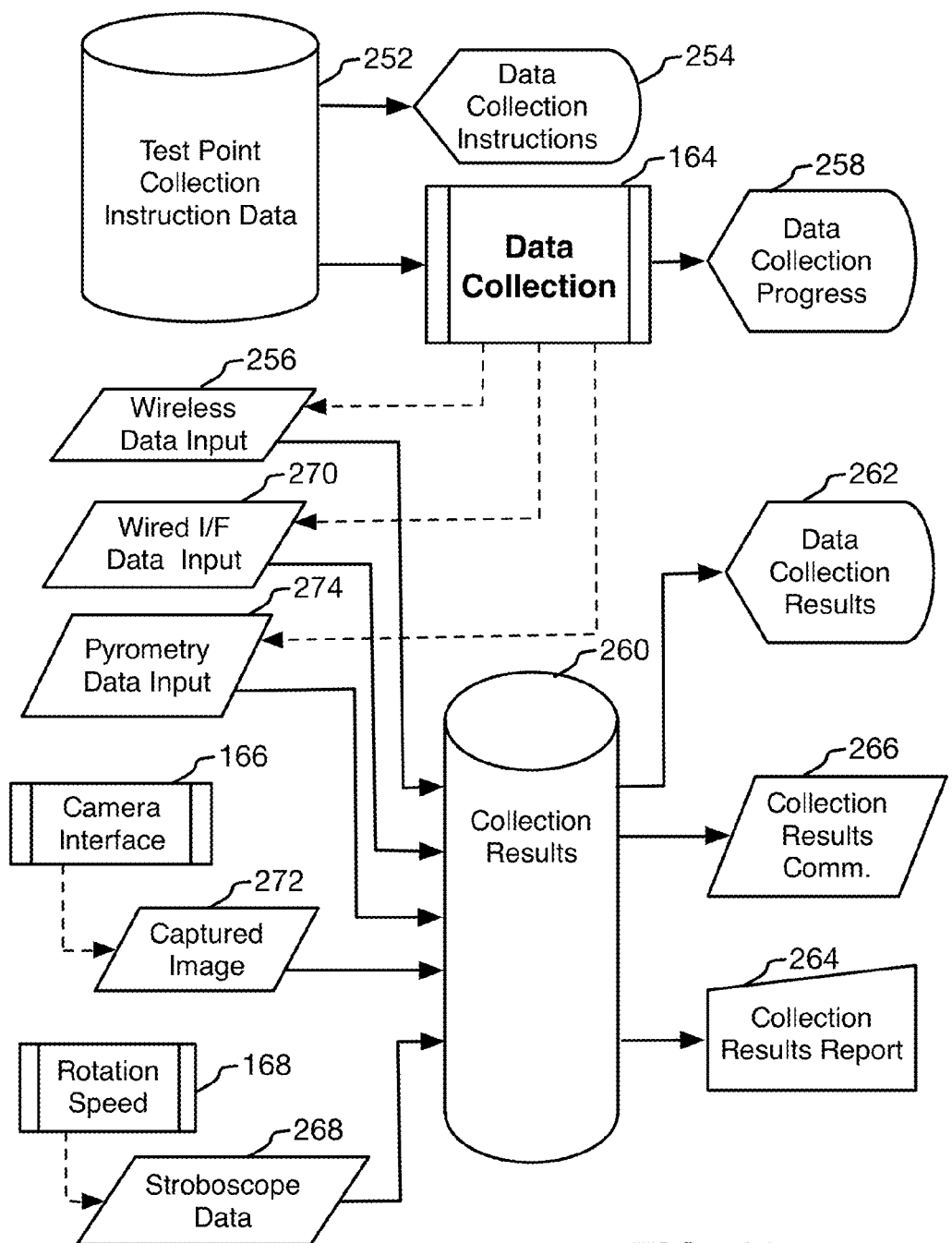
FIG. 13 is a data and control diagram of the data collection process of the data collection unit.

After a link 150 is established, the data collection process 164 is activated. FIG. 13 shows a data and control flow of the data collection process 164. The technician enters a command to commence data collection at the test point from the sensor unit 18. (In other embodiments the data collection occurs automatically in response to the pairing without the need for the technician to enter a command to commence the process.) The signal processor 77 of the sensor unit 18 responds to commands sent from the data collection device 14. The processor 30 may send a command indicating that the signal processor 77 should start collecting sensor readings from one or more sensors 74, 80 and have the raw sensor data transmitted to the data collection device 14. The signal processor 77, for example, samples the sensors 79a, 79b, 79c, 80 at a predetermined (or commanded) rate for the specified sensor(s) (at step 218), and instructs the Wi-Fi interface to transmit raw sensor data in real time. The signal processor 77 receives commands from the data collection device 14 to begin, pause or halt sending sensor data from a given sensor 79a, 79b, 79c, 80. A conventional Wi-Fi communication protocol is preferred for establishing a link 150, and for sending and receiving communications between the sensor unit 18 and the data collection device 14.

At step 220, the raw sensor data is streamed from the sensor unit 18 to the data collection device 14 via the wireless interfaces 44, 76 based on sensor reading sampling by the signal processor 77. The data collection device receives the wireless data 256. The data collection device 14 displays the progress 258 of the data collection on the display 33. The raw data received is stored as data collection results data 260.

During a measurement process for a test point location of a machine (e.g., data collection of accelerometer data from the test point location), the display 33 is configured to display a progress bar of the progress of the measurement, a time signal of the measurement and values of overall levels of the measurements. During such measurement process, the data collection device 14 maintains further functionality for the technician to interact through the user interface to select further operations. For example, software modules further configure the processor 30, touchscreen 15 and other components as needed to record via audio input interface 56, to capture a photograph with the camera 36 (i.e., visual light image, infrared light image), to playback previously recorded audio, or to display a photograph. For example, a technician will record an audio comment, such as a note about the machine, the test point, or the data collection; or record the audio sound of the machine. Such audio note is automatically stored among the data collection results 260. As another example, the technician will operate the camera to capture an image 272 or motion picture, such as a visual image photograph or video clip. Inspection photographs or videos of the machine, the test point location, or the machine vicinity are taken and stored to document the visual condition of all or part of the machine, or to show a hazard at or in the vicinity of the machine. For example a photograph is taken to show ice on a machine, an oil leak or spill, a missing mounting stud accessory on the machine, or to show that the test point is not accessible. Such images (e.g., visible light image; infrared image) and videos are automatically stored among the data collection results 260 and included in the report 264 and communication 266 without further manual intervention by the technician.

When data collection for the test point is complete as determined automatically based on the software parameters in the setup module for the test point location, the processor 30 sends a command to the signal processor 77 to discontinue the streaming of the raw sensor data. At step 22 the signal processor 77 stops commanding the Wi-Fi interface 76 to stream the sensor data.

Figure 14:
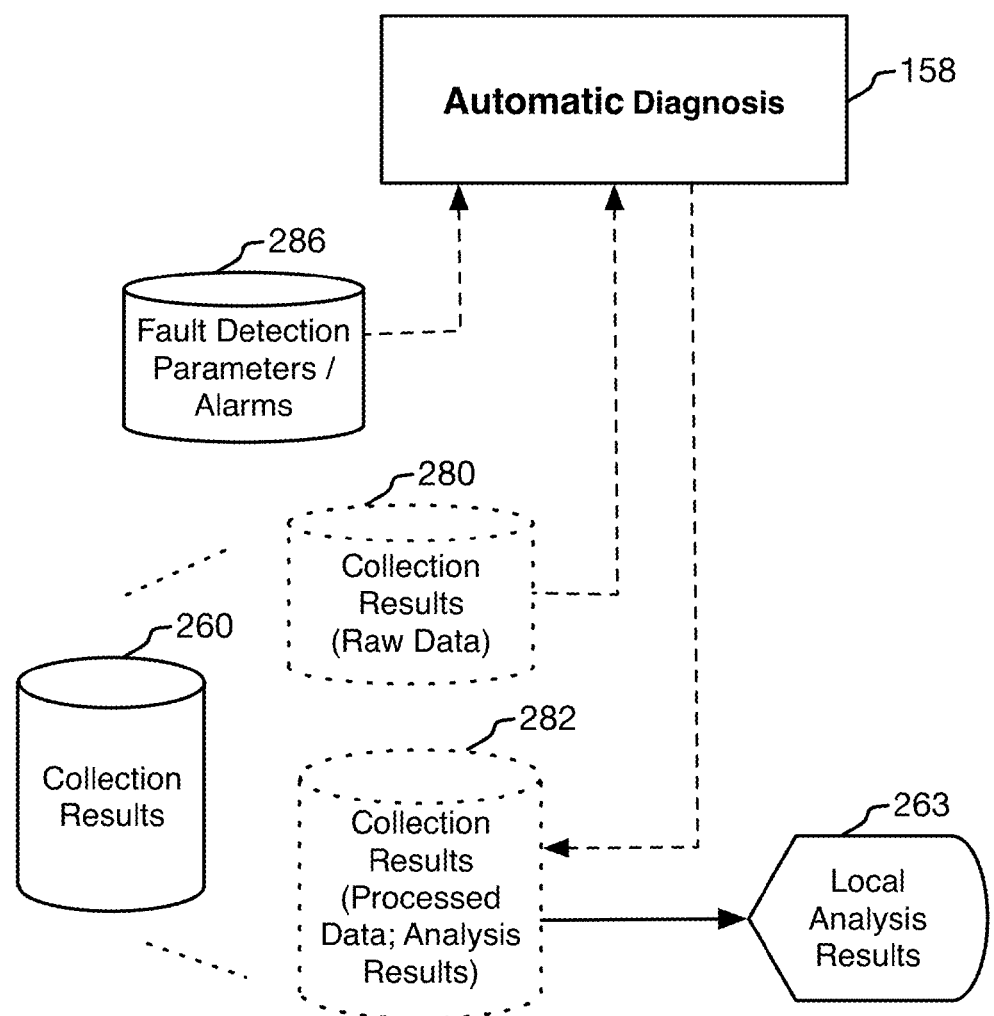
FIG. 14 is a data and control diagram of an automated diagnosis process of the data collection unit.

After data collection is complete for a given test point, the results 262 of the data collection, and the results 263 (FIG. 14) of the related automated diagnosis are displayed, as applicable. Automated diagnosis is performed automatically in the background (or displayed in the foreground) during the data collection process or immediately thereafter as the data becomes available. Such automated diagnosis is started automatically by the data collection process 164, as per data collection setup parameters. In particular among the setup data for a test point are controls for specifying which if any automated diagnosis processes are to be performed on the data collected for the current test point (or machine). Automated diagnosis, for example, for some test point prescriptions, includes accessing fault detection parameters and alarms 286 to generate processing results data 282 from the collected raw data 280. In other embodiments any one or more of the automated diagnosis sub-modules 170-176 are executed according to the test point prescription. In some embodiments, the test point instructions include instructions for the technician to start the automated diagnosis module(s). In preferred embodiments the automated diagnosis module(s) are executed automatically without the technician manually starting execution of a technician selected sub-module 170-176.

In some embodiments the technician prints a report 264 of the results or transfers the results in a communication 266 to the computing system 16 at the time of the completion of data collection for a given test point or machine. Typically, reports 264 and computing system 16 communications 266 are generated instead after completion of the entire route.

Also included among the collection results 260 are the rotation speed results, when performed rotation speed processing 168 is performed on acquired stroboscope data 268 for a test point. Although wireless data 256 is collected, at another test point on the same route data 270 instead is collected through one of the wired data interfaces 50, 52, 54, and included among the data collection results 260 (and subsequently displayed, and/or included in a printed report or a communication). Also for some machines or test points, collections results data 260 include a photograph, video, or infrared image, as an image 272 captured by the camera 36 using the camera interface 166 software during collection of data for the current test point. Collection results data 260 also includes pyrometer data 274 when pyrometry is performed by the pyrometer 38 on the machine during collection of data for a current test point.

When all data collection activities for the current test point location are complete, the technician dismounts the sensor unit 18 (at step 224). In some instances the technician also may turn off the sensor unit 18. The route companion module 154 then advances to the processing routines for the next test point for the current machine. Accordingly, instructions are displayed for collecting data from the next test point on the same machine 12. Steps 206-224 thus are repeated for the next test point using the same or a different sensor unit 18. When all test point data collection is done for the machine 12, the route companion module 154 advances to the processing for the next machine 12. After data collection is complete for a given machine, the technician moves on to another machine along the route and repeat the steps (e.g. steps 202-224) again as needed to collect data from one or more test points on the next machine 12. Such repetitions continue as the technician goes from machine to machine until the end of the route.

It is noted that the machines from which data is being collected need not be the same machine 12 specimen or model, and can be different machines of a different type having different parts. The number of test points from which data is to be collected on any machine along the route may vary, and have different data collection instructions displayed to the technician. Of significance is that the same sensor unit 18 is mounted and dismounted for any, all or a subset of the test points on a given machine, or for any, all or a subset of the test points among any, all or a subset of all the machines. The ability to quickly mount and dismount the sensor unit 18, such as by simply placing the sensor unit (with magnetic mounting accessory 130/140) on the surface of the machine and simply pulling the sensor unit 18 from the surface of the machine, along with the ease with which the sensor unit 18 can be handled due to the omission of wires, provides an improvement in time efficiency and in technician and machine safety during the performance of each route.

Figure 15:
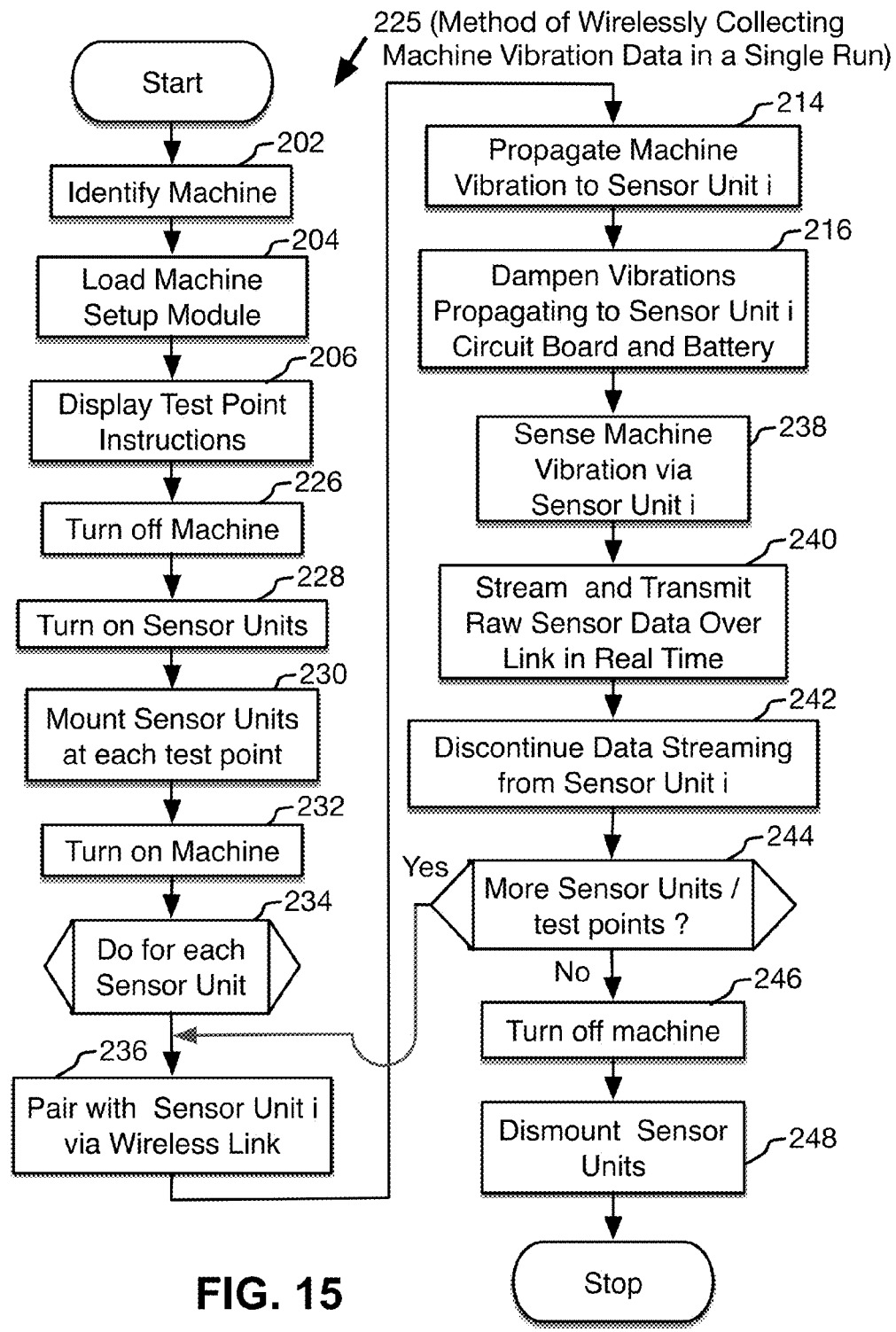
FIG. 15 is a flow chart of a method for wirelessly collecting machine diagnostic data to the handheld machine diagnostic data collection device using a plurality of sensor units, according to an embodiment of the present invention.

For some machines, it may be necessary to turn off the machine in order to mount the sensor unit 18. Rather, than turn the machine on and off multiple times to mount the sensor unit 18 at different test point locations on the same machine 12, a plurality of sensor units 18 may be used. FIG. 15 is a flow chart for a method 225 for wirelessly collecting diagnostic data, including vibration data, from multiple sensor units 18 in a single run. Steps that are the same as described above with regard to the method 200 are given the same reference number and implement the same functions.

Once the machine 12 is identified and the instructions 254 are displayed at step 206, the technician sees among the displayed instructions 254 that the machine 12 is to be turned off and multiple sensor units 18 are to be mounted. At step 226 the machine 12 is turned off. At step 228 all the sensor units 18 (and sensors 22 if applicable) are turned on. At step 230 each one of the sensor units 18a, b, c and sensor 22 to be mounted as per the displayed instructions are mounted to the machine 12 (See FIG. 1). Once mounted, the machine 12 is turned back on. As per method 200, at step 214 machine vibrations propagate into each sensor unit 18 and are damped at step 216.

With the machine 12 on and the sensors mounted, a single run is performed by the data collection device 14, during which machine diagnostic data 256/270 is collected automatically from the mounted sensors. In an example embodiment, data collection is performed automatically in sequence from one test point then another without technician intervention (e.g., other than to commence the sequence). In other embodiments data collection occurs in parallel for all sensor units 18 (and sensor(s) 22, if applicable) without technician intervention (e.g., other than to commence the parallel activity), such as through multiple links 150. For the sequential collection of data (see step 234), at step 236 a first sensor unit 18a is paired with the data collection device 14 as per the protocol described above with regard to method 200. The data collection unit 14 sends a command to the sensor unit 18a, which is processed by the signal processor 77. The signal processor 77 responds as commanded, such as by sampling the sensor(s) 74/79a,b,c/80 at step 238 and commencing streaming of raw sensor data from one or more sensors of the sensor unit 18a at step 240. The data collection device 14 sends command to begin, pause, resume or end data collection and streaming. The data collection device 14 determines when the data measurement/collection is complete, and sends a command to the sensor unit 18 instructing the signal processor 77 to end the streaming of raw sensor data. At step 242, the sensor unit 18a in response discontinues streaming data over the wireless link 150. The link 150 with the sensor unit 18a may be terminated at any time thereafter. For example, the link may be terminated before a link is established with the next sensor unit 18b.

At step 244 the data collection device 14 determines whether there is another sensor unit from which data is to be collected as part of the single run. If so, then a sequence is repeated of steps 236-244 for the next sensor unit 18b. For the example in FIG. 1, the sequence is repeated for sensor units 18b ad 18c and for data collection by wired communication for sensor 22. It is noted that the data collection from sensor 22 is performed either as part of the sequence or is performed in parallel with the wireless data collection, according to the embodiment and regardless of whether the wireless data collection from sensor units 18a, b, c is collected in sequence or in parallel. Once at step 244 the data collection device 14 determines that data collection is complete for the single run (i.e., for all sensors encompassed by the single run), at step 246 the machine is turned off and thereafter at step 248 the sensor units 18a, b, c and sensor 22 are dismounted, as applicable. The machine 12 then may be turned back on and returned to normal service. In some instances, such as when the automated fault diagnosis results in a recommendation to turn the machine off, the machine 12 is not returned immediately to normal service.

Method for Linking Photograph with Test Point Location

A method also is provided for improving identification of test points so as to assure the sensor unit is mounted according to an appropriate orientation to properly align axes of a tri-axial accelerometer. Such method reduces mis-identification of a machine or test point, mal-positioning of the sensor unit.

Condition monitoring of a rotating machine using vibration analysis helps to determine and forecast the evolution of a health grade of a machine through trend analysis. To do so, vibration measurements are collected on a periodic basis. To be reliable for determining a trend, however, the position of the sensor unit 18 should be identical from one control measurement on one day during one route to another control measurement of the same control at another time, such as on another day during another or the same route to ensure any difference in the measurements are due to the machine vibrations and not the position or orientation of the sensor unit With the global social trend of vibration analysis, industries applying test point monitoring for conditions have less and less qualified personnel (having the required knowledge of vibration analysis) to perform the measurements in an effective manner. In addition to the personnel qualification, companies also tend to outsource the data collection service. Thus, machine diagnostic data collection often is performed by different people at different times. Accordingly, there is a need for assuring that the sensor unit 18 will be put in the same position (at the same orientation) on the machine. Satisfying such need is a prerequisite for effective trend analysis of machine diagnostic data monitoring.

Using the embedded camera 36, the data collection device 14 allows the technician to take a picture of the sensor unit's position. The data collection device 14 processing then associates automatically the captured photograph with the current test point. The photograph then is displayed automatically on display 33 to the technician each time data collection is performed for such test point. Such photograph is a simple to understand effective display of information useful for assuring that the sensor unit 18 is mounted in the same position every time for the specific test point, whoever is performing the data collection. Accordingly, the data collection device 14 improves the reliability of the vibration analysis or other diagnosis performed by other personnel or by an automatic expert system, based measurements collected over time from the given test point of the given machine.

The data collection device 14 also allows a technician any moment during data collection setup and acquisition to take inspection photographs or videos of the current machine using the embedded camera 36 to illustrate observed phenomenon or environmental conditions. Such photographs and videos are automatically stored along with the vibration data as data collection results data 260 and printed out automatically in the corresponding report 264 or upload 266 without any additional manual intervention. In some embodiments an audio input also is provided enabling the video to include audio.

Establishing the diagnosis of a rotating machine is a complex part of a vibration analysis service. Other types of data can be relevant and helpful to improve diagnosis productivity and reliability. The data collection device 14, as embedded with the infrared module of the camera 36, allows the technician to capture infrared images of the machine 12, and have the images stored automatically along with the collected vibration data. The settings (e.g., EM spectral range) for the captured infrared image(s) are automatically included in the data collection results 260 with the infrared image and automatically uploaded to a vibration analysis software module on the computing device 16 in a communication 266, and automatically printed out in the report(s) 264, along with the vibration data and other data collection results 260.

To provide such capabilities, at any time during a route, the technician can access the camera interface software 166 to take a picture. In some instances the technician takes a photograph of the machine, the test point location, or the machine vicinity to document an oil leak, spill, or other visual condition of all or part of the machine, or to show a hazard at or in the vicinity of the machine. At other instances the technician takes a photograph to use as a future aid for mounting the sensor unit and collecting data from the test point at another time during another performance of the same or a different route. The first type of photograph pertains to the specific performance of the route, (e.g., environmental conditions on a given date). The second type of photograph pertains to every time data is to be collected from the specific test point of the specific machine that was photographed, (e.g., the sensor unit orientation for the specific test point on the specific machine). The first type of photograph (e.g., captured image 272 at FIG. 13) is stored with the data collection results 260 for the current performance of the current route, and is included in the report 264 or communication 266. The second type (e.g., photograph 276—see FIG. 12) is stored with the test point data collection instruction data 252 for the current test point of the current machine from which data is collected and used during subsequent setups for such test point.

Handling of a photograph captured using the camera interface module 166 as the first type or the second type is based on the procedure the technician uses to call the camera interface module 166. A normal manner of accessing the camera is to access the toolbar user interface. For such photographs, the photograph (e.g., captured image 272 at FIG. 13) is treated as the first type and stored with the data collection results 260 for the current performance of the current route.

Figure 16:
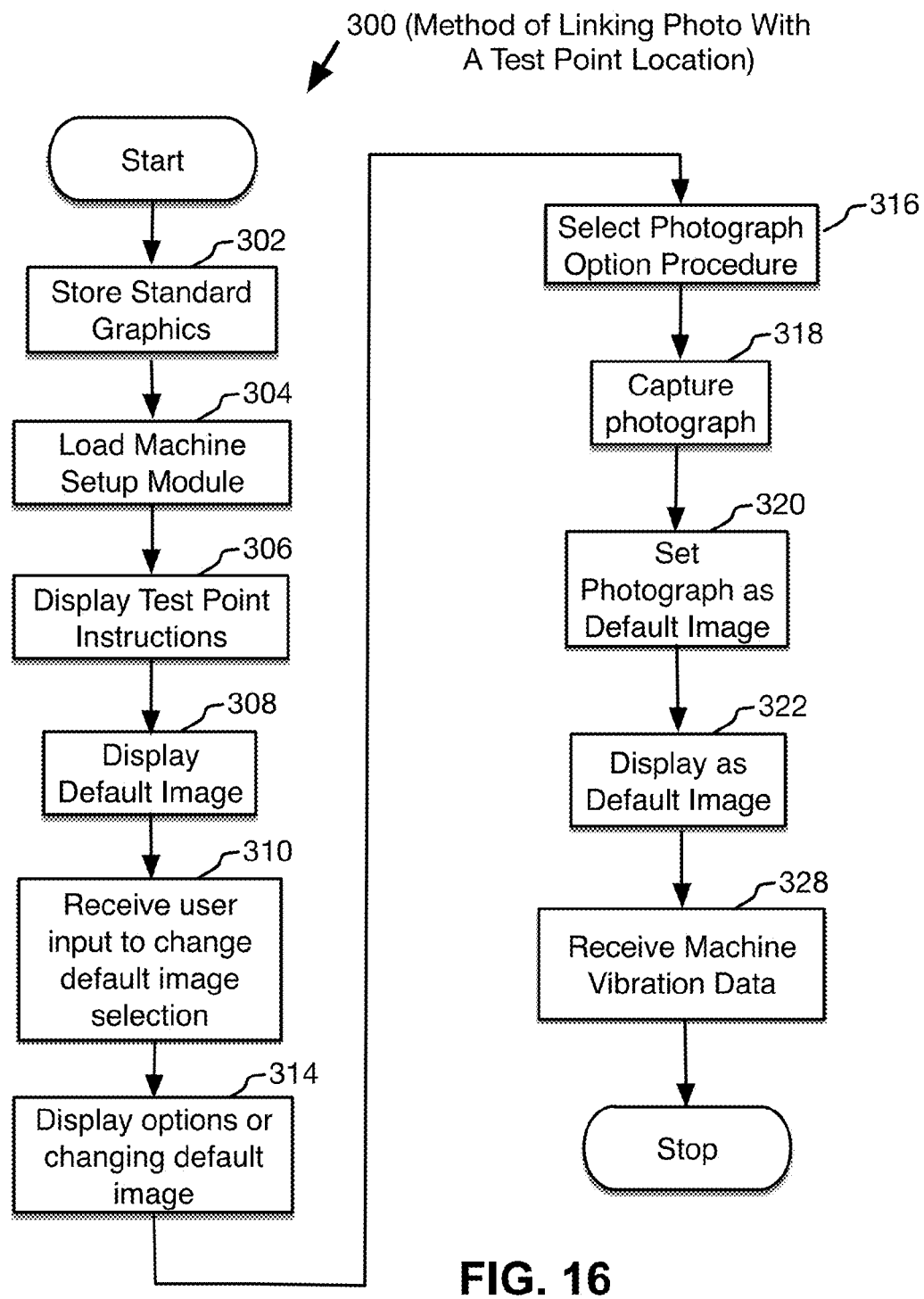
FIG. 16 is a flow chart of a method for linking a photograph with a test point location, according to an embodiment of the present invention.
Figure 17:
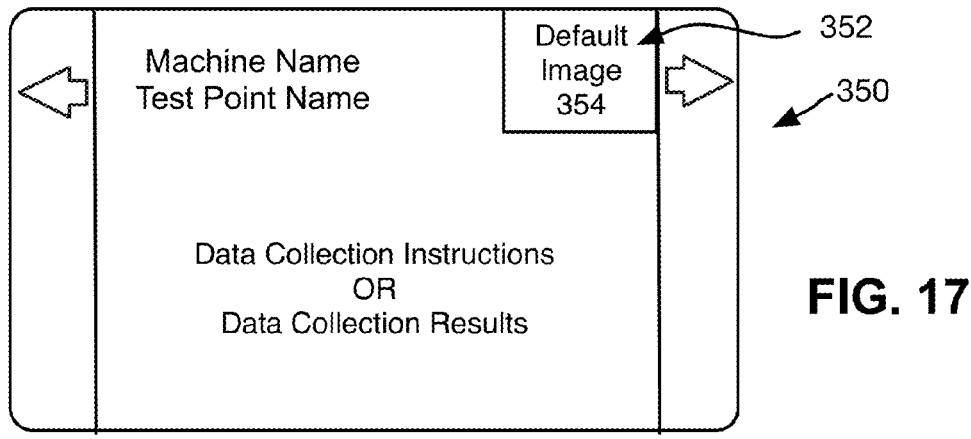
FIG. 17 is an illustration of a data collection instructions displayed-content-screen (and data collections results screen) of a display of the data collection device, according to an embodiment of the present invention.
Figure 18:
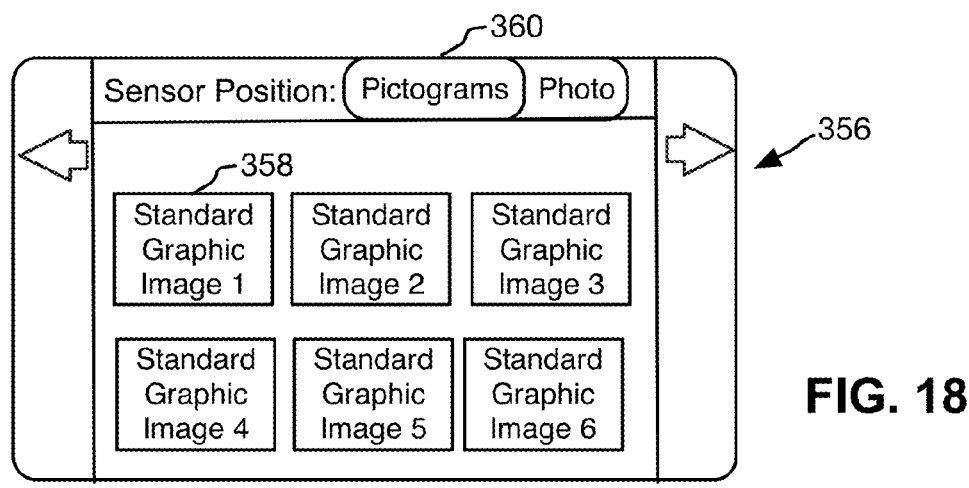
FIG. 18 is an illustration of sensor position image selection first screen of a display of the data collection device, according to an embodiment of the present invention.

Photographs of the second type are linked instead with the test point instructions and parameters and by a different procedure. FIG. 16 is a flow chart of a method 300 for linking a photo with a test point prescription. At step 302 graphics are pre-stored in the data collection device 14 memory, such as prior to performance of a route. After the data collection instruction data 252 is loaded for the current machine at step 304, instructions 254 are displayed for a current test point at step 306 on a data collections instructions screen 350 (FIG. 17). On the same screen a portion of the screen includes an image area 352 for a visual aid. The visual aid is to show the technician how the sensor unit 18 or sensor 22 is to be mounted at the test point. A default image 354 is displayed within the visual aid image area at step 308. In some instances no default image may have been selected yet or a prior selection may have been cancelled. In such case the image area is blank or includes some placeholder image. The technician clicks on the image area to change the contents of the visual aid image area. At step 310 the input is received and processed resulting at step 314 in the displaying of a set of standard graphic images on display 33 at a default image selection screen 356 (FIG. 18), such as pictograms 358 or icons. Each image depicts a different orientation for mounting the sensor unit 18 or sensor 22 relative to a reference surface, (i.e., corresponding to that of any machine). One pictogram illustrates the sensor having an orientation where the sensor z-axis corresponds to one mounting orientation relative to the machine. Another pictogram illustrates the sensor having a second, different orientation where the sensor z-axis corresponds to a different mounting orientation relative to the machine. Another pictogram illustrates the sensor mounted to one location on a mounting fixture of the machine. Another pictogram illustrates the sensor mounted to another location on the mounting fixture (for the same test point location) of the machine—and corresponding to a different orientation of the sensor axes relative to the machine. These graphic images are standard in the sense that they are available for display for the technician to choose from for any test point of any machine where the setup process 162 for the test point instructions uses a screen template having such a visual aid area for showing the default image. The technician clicks on a desired one of the standard graphic images and closes the window. The selected standard graphic image then is displayed in the visual aid image area for that specific test point. The selected standard graphic image now is the default image for the visual aid area for that test point of that machine from then on, until changed. Thus, during any subsequent performance of the route, or another route, or for an off-route data collection of that test point of that machine, the selected standard graphic image will be displayed automatically with the data collection instruction on the data collection instructions screen (e.g., when a template including a visual aid image area is used to generate the screen).

Figure 19:
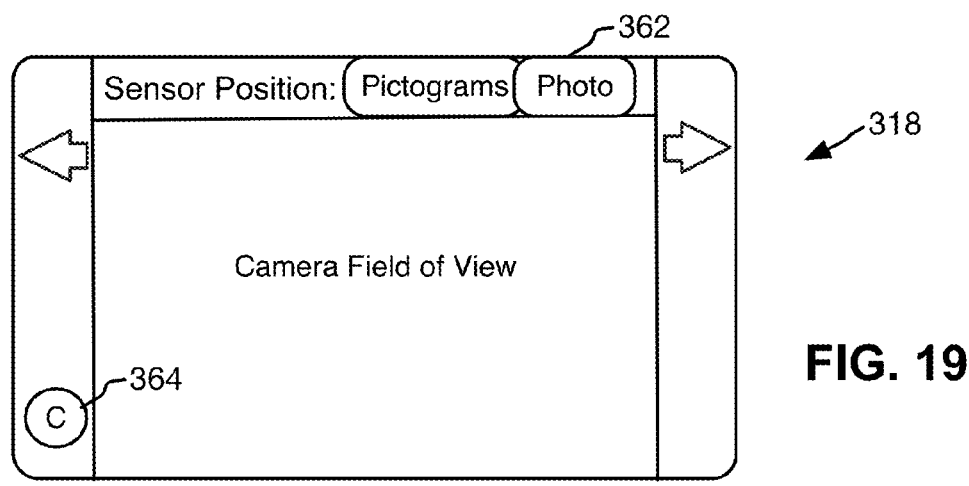
FIG. 19 is an illustration of sensor position image selection second screen of a display of the data collection device, according to an embodiment of the present invention.
Figure 20:
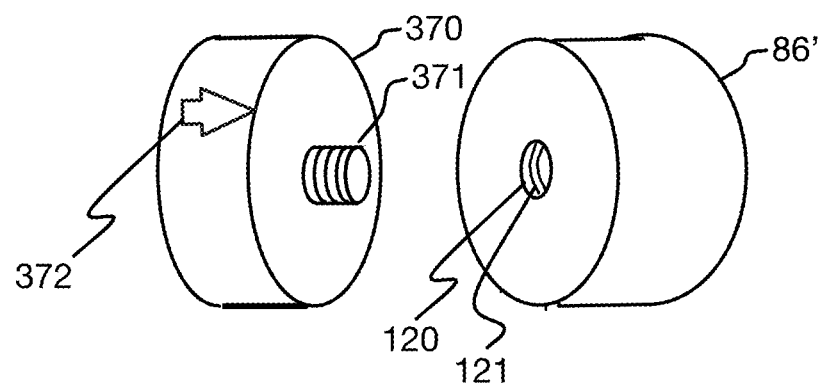
FIG. 20 is a diagram of a cylinder blank and reference stud used for manufacturing a sensor unit base, according to an embodiment of the present invention.

When the technician clicks on the visual aid image area and is shown the set of standard graphic images, the technician also has the opportunity, instead of selecting from among the standard graphic images, to open the camera interface from that screen to take a photograph. In an example embodiment the set of standard graphic images are associated with one browser-like tab 360. A second tab 362 (FIG. 19) selects a procedure to take a photograph to be used instead as the default image for the visual aid area. The technician clicks on such tab at step 316 and the camera field of view is displayed within all or a portion of the screen of display 33. The technician aims the data collection device 14 and thus the embedded camera lens, then clicks on a control 364 to take a photograph (at step 318). The captured photograph 27 is stored at step 320 as the default image for the visual aid area for that test point of that machine from then on, until the default image is changed. When the technician closes the camera field of view screen, the photograph is displayed at step 322 in the visual aid portion 352 of the screen 350 of the data collection instructions. During any subsequent performance of the route, or another route, or for an off-route data collection of that test point of that machine, the captured photograph is displayed automatically as the default image 354 among the data collection instructions on the data collection instructions screen 350 (e.g., when a template including a visual aid image area is used to generate the screen), until the default image 354 is changed to another photograph or to one of the standard graphic images using the procedures described. In addition the technician can cancel a default image selection and return to a blank or placeholder image in the visual aid area.

In some embodiments the visual aid image area 352 with the default image 354 therein remains on screen during data collection. By clicking on the image area 352 the same procedure can be followed to change the default image 354. Accordingly, in some embodiments a photograph for showing the sensor position at the current test point of the current machine can be taken at any time during the data test point setup and data test point collection processes and be set as the default image.

Method of Manufacturing Sensor Unit for Indexed Accelerometer Axes

As previously described, a preferred embodiment of the female threaded opening 120 of sensor unit 18 has a thread 121 indexed to the axes 127 of the tri-axial accelerometer 74, (see FIG. 8). In particular, a reproducible angular position of the sensor base 86 is achieved when screwed at a prescribed torque on any stud 122 (e.g., initially glued to a desired position on the machine). More significant is that for any given stud 122 fixed to a machine, any sensor unit 18 screwed on at the prescribed torque will have the same reference position of the sensor unit's x-axis and y-axis of measurement relative to the stud 122 and machine 12 to which the stud is affixed. Thus, by affixing a stud 122 at a desired position and orientation to align the axes of measurement of the sensor unit 18 with the desired axes of measurement for the test point of the machine, such alignment is established for every sensor unit. Thus, the sensor units 18 are interchangeable at any test point of any machine without the need for individualized additional referencing when removably mounting a sensor unit 18 to a stud 122 of a machine 12.

Achieving a standard alignment as discussed above is not an obvious task. Of significance is that there is no way to mill the threaded opening 120 of the sensor unit 18 to achieve a reproducible angular "start" of the thread 121 at a precise surface of contact. Therefore, milling alone will not provide a way to achieve the same circumferential position of the x-axis and y-axis relative to the sensor unit's end of thread 121 position for all manufactured units. The tolerances of the milling process are not sufficient. Therefore, to achieve the desired indexing, the sensor unit base 86 is manufactured according to the method now described.

At one step a raw metallic solid cylinder 86' is machine to the desired outer diameter of the base 86. At a next step, the bottom surface of the cylinder 86' is planed to a desired flat planar surface. At a next step the threaded opening 120 is formed in the cylinder 86'. At a next step, the cylinder 86' is screwed on a reference stud 370 on to the end of travel of the thread 121 of the threaded opening 120. At the end of travel of the thread 121 of the threaded opening 120 the cylinder 86' force continues to be applied to the screwing effort up to the prescribed torque. This is the same torque to which every sensor unit 18 is to be screwed when removably mounting the sensor unit 18 at an accessory stud 122.

With the cylinder 86' screwed to such prescribed torque, an angular reference is made, which is to be used for every sensor unit base 86 to be manufactured according to this method. For example, an angular reference 372 on the reference stud 370 serves as the angular reference. This reference is used to precisely reference the circumferential displacement of each hole 85a, b, c for each of the tri-axial accelerometer x-axis and y-axis sensing components 79a,b relative to the angular reference 372. (Note that the z-axis is along the length of the sensor unit 18 and thus is unrelated to the circumferential position, which is orthogonal to the z-axis.) At a next step each hole 85a,b is machined. After such step, each hole 85a,b, is precisely indexed relative to the thread 121 of the threaded opening 120 so that whenever the cylinder 86 is screwed to the prescribed torque, the openings 85a,b are in the same precise rotational position. Accordingly, the x-axis and y-axis of measurement for the accelerometer is at the same rotational position relative to the thread 121 for every sensor unit 18 specimen. At subsequent steps the remainder of the sensor base 86 is machined, and the sensor unit 18 is assembled. Note that the order of the steps is significant for performing the manufacturing process to achieve the indexing of the x-axis and y-axis of measurement for the tri-axial accelerometer relative to the thread 121.

The advantage of such manufacturing method is that sensor unit 18 specimens having tri-axial accelerometers may be used indifferently without need for further individual sensor unit 18 referencing. Once a stud 122 is placed in a desired position any sensor unit 18 screwed on at the prescribed torque will have the same reference position of the x-axis and y-axis (and z-axis) relative to the stud 122 and machine 12 to which the stud is affixed without any adverse impact on the efficiency and quality of the measurement. This is important for large industrial sites with a significant population of operators and instrument, or even in case of replacement of a sensor unit, as it is not necessary to dismount studs 122 and glue them on again at every machine in a new position for a new sensor specimen.

Other Remarks

As described above, frequency response impacts of mass and volume of the second wireless interface, the signal processor, the circuit board, and the battery on dynamic behavior of the sensor unit are reduced by means including an elastomeric member 102. In some embodiments, the means is embodied by multiple elastomeric members 102, 104, 106. In some embodiments, the means further includes the air gap 91. In still other embodiments the means further includes a housing 90 having a profile portion as described from the trough 95 to the point 97 or to the top of the housing 90.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. The invention is intended to extend to all functionally equivalent structures, methods and uses, such as are within the scope of the appended claims. Those skilled in the art, having the benefit of the teachings of this specification, may affect numerous modifications thereto and changes may be made in form and details without departing from the scope and spirit of the invention.

What is claimed is:

1. A machine diagnostic data collection system for collecting vibration data from a rotating machine, the system comprising:

a portable, machine-diagnostic, data collection unit comprising a first wireless data interface, a processor, a memory, a display, an operator input device, and a first battery;

a sensor unit configured as a single body, removably mounted in its entirety to a test point location on the machine in a manner by which machine vibrations propagate into said single body;

wherein the sensor unit comprises a housing, an accelerometer, a second wireless interface, a circuit board, a signal processor, a battery, and an elastomeric member;

wherein the sensor unit is configured to wirelessly link to the portable, machine-diagnostic, data collection unit, and to transmit wirelessly in real time to the portable, machine-diagnostic, data collection unit raw data sensed by the accelerometer;

wherein the elastomeric member is configured to reduce frequency response impacts of mass and volume of the signal processor, circuit board, and battery on dynamic behavior of the sensor unit with respect to machine vibrations by damping vibrations introduced by said circuit board, signal processor, and battery in response to said machine vibrations, thereby vibrationally-decoupling, in part, the sensing component from the signal processor, circuit board, and battery;

wherein the elastomeric member comprises a first elastomeric part, a second elastomeric part and a third elastomeric part;

wherein the first elastomeric part is located at a first end of the circuit board and a first end of the battery toward the sensing component;

wherein the second elastomeric part extends longitudinally along a face of the rechargeable battery;

wherein the third elastomeric part is located at a second end of the circuit board and a second end of the battery away from the accelerometer; and wherein the first elastomeric part, second elastomeric part and third elastomeric pard are configured to reduce frequency response impacts of mass and volume of the second wireless interface, the signal processor, the circuit board, and the battery on dynamic behavior of the sensor unit with respect to machine vibrations by damping vibrations introduced by said second wireless interface, circuit board, signal processor, and battery in response to said machine vibrations.

2. The machine diagnostic data collection system of claim 1, wherein the accelerometer is a tri-axial accelerometer having one or more sensing components, wherein the first elastomeric part separates each sensing component of said one or more sensing components from said signal processor, circuit board, and battery, and wherein said first elastomeric part, second elastomeric part, and third elastomeric part are configured to vibrationally-decouple, in part, said each one sensing component from the signal processor, circuit board, and battery so that a frequency response rating of the sensor unit is no more than +/−3 db at 5 kHz on a z-axis.

3. The machine diagnostic data collection system of claim 1, wherein the sensor unit is a first sensor unit and the accelerometer is a tri-axial accelerometer, and further comprising:

a mounting mechanism having a first threaded member and being fixedly attached to said machine at a first test point position; and a second sensor unit having a tri-axial accelerometer; and wherein each one sensor unit of the first sensor unit and second sensor unit have a base portion with a second threaded member adapted to mate to the first threaded member of said mounting member when removably mounted to said mounting member, the second threaded member being indexed with respect to an x-axis, y-axis and z-axis of the tri-axial accelerometer, said tri-axial accelerometer of said one sensor unit being situated in said base portion; and wherein the first threaded member and the second threaded member are configured so that for each one sensor unit of the first sensor unit and second sensor unit when fully mated to an end of travel position at a prescribed installation torque to the mounting mechanism at said one sensor unit's corresponding test point position on said machine, a known repeatable prescribed positioning is achieved in which said x-axis and y-axis of the tri-axial accelerometers are aligned, respectively with an x-axis and y-axis of measurement for the machine, regardless of whether the first sensor unit or the second sensor unit is removably mounted without further individualized referencing of the first sensor unit and second sensor unit at the time of mounting.

4. The machine diagnostic data collection system of claim 1, wherein the sensor unit is a first sensor unit of a plurality of sensor units and the test point location is one of a plurality of test point locations on the machine;

wherein each one sensor unit of the plurality of sensor units is configured as a single body, removably mounted in its entirety to a corresponding one test point location on the machine among said plurality of test point locations in a manner by which machine vibrations propagate into said single body for each one of said plurality of sensor units;

wherein the data collection device is configured to collect machine diagnostic data from each one of the plurality of wireless sensor units in series as part of an automated sequence in which upon completion of data collection from said one sensor unit data collection commences from another sensor unit among the plurality of sensor unit automatically according to an order determined by said automated sequence.

5. The machine diagnostic data collection system of claim 1, wherein the sensor unit is a first sensor unit of a plurality of sensor units and the test point location is one of a plurality of test point locations on the machine;

wherein each one sensor unit of the plurality of sensor units is configured as a single body, removably mounted in its entirety to a corresponding one test point location on the machine among said plurality of test point locations in a manner by which machine vibrations propagate into said single body for each one of said plurality of sensor units; and wherein the data collection device is configured to collect machine diagnostic data from each one of the plurality of wireless sensor units in parallel.

6. The machine diagnostic data collection system of claim 1, further comprising a machine data diagnostic analysis unit separate from the data collection unit and receiving data from the data collection unit, the machine data diagnostic analysis unit configured for performing vibration data analysis on first data among said received data.

7. The machine diagnostic data collection system of claim 1, wherein the portable, machine-diagnostic, data collection unit further comprises an embedded camera, a pyrometer, and a stroboscope.

8. The machine diagnostic data collection system of claim 1, wherein the portable, machine-diagnostic, data collection unit further comprises an embedded infrared imaging camera.

9. The machine diagnostic data collection system of claim 1, wherein the processor is configured to execute a machine setup module for said machine;
  wherein said display is configured to display instructions for collecting data with the sensor unit for the test point location on the machine in accordance with said execution of the machine setup module by the processor;
  wherein said display is further configured to display among said instructions a set of standard graphic images, as determined by the processor, depicting alternative positioning of the sensor unit on said machine at said test point location, each one standard graphic image of said set corresponding to a different axial alignment of the sensor unit; and
  wherein the processor is further configured to store one of said set of standard graphic images as a default image to be displayed among said instructions for gathering data at said test point location of said machine, said processor being configured to command the display to display said default image.

10. A machine diagnostic data collection system for collecting vibration data from a rotating machine, the system comprising:
  a portable, machine-diagnostic, data collection unit comprising a first wireless data interface, a processor, a memory, a display, an operator input device, and a first battery;
  a sensor unit configured as a single body, removably mounted in its entirety to a test point location on the machine in a manner by which machine vibrations propagate into said single body;
  wherein the sensor unit comprises a housing, an accelerometer, a second wireless interface, a circuit board, a signal processor, and a battery;
  wherein the sensor unit is configured to wirelessly link to the portable, machine-diagnostic, data collection unit, and to transmit wirelessly in real time to the portable, machine-diagnostic, data collection unit raw data sensed by the accelerometer;
  wherein said processor is configured to execute a machine setup module for said machine;
  wherein said display is configured to display instructions for collecting data at said test point location of said machine;
  wherein the data collection unit further comprises an embedded camera and a photographic image captured by said camera of the sensor unit as mounted at the test point location on said machine;
  wherein the processor is configured to automatically store said captured image with said instructions for collecting data at said test point location of said machine; and
  wherein the processor is configured to load said captured photographic image with said instructions as a default image for showing positioning of the sensor unit on said machine at said test point location during a subsequent execution of the machine setup module.

11. A machine diagnostic data collection system for collecting vibration data from a rotating machine, the system comprising:
  a portable, machine-diagnostic, data collection unit comprising a first wireless data interface, a processor, a memory, a display, an operator input device, and a first battery;
  a sensor unit configured as a single body, removably mounted in its entirety to a test point location on the machine in a manner by which machine vibrations propagate into said single body;
  wherein the sensor unit comprises a housing, an accelerometer, a second wireless interface, a circuit board, a signal processor, a battery, and an elastomeric member;
  wherein the sensor unit is configured to wirelessly link to the portable, machine-diagnostic, data collection unit, and to transmit wirelessly in real time to the portable, machine-diagnostic, data collection unit raw data sensed by the accelerometer;
  wherein the elastomeric member is configured to reduce frequency response impacts of mass and volume of the signal processor, circuit board, and battery on dynamic behavior of the sensor unit with respect to machine vibrations by damping vibrations introduced by said circuit board, signal processor, and battery in response to said machine vibrations, thereby vibrationally-decoupling, in part, the sensing component from the signal processor, circuit board, and battery;
  wherein the sensor unit further comprises:
  a base portion comprising a base member and the accelerometer; and
  an upper portion comprising the signal processor, the second wireless interface, and the battery, said elastomeric member comprising a first elastomeric part separating the base member and a sensing component of the accelerometer, from the signal processor, the battery, and the second wireless interface of the upper portion; and
  wherein the housing comprises a base portion housing circumferentially surrounding the base member along a length of the base member, and an upper portion housing circumferentially surrounding the second wireless interface, signal processor and battery;
  wherein the base portion housing and upper portion housing adjoin to form respective lower and upper length portions of the cylindrical body;
  wherein the signal processor is electrically coupled to the accelerometer and samples an output signal of the accelerometer;
  wherein the second wireless interface is electrically coupled to the signal processor and is configured to transmit wirelessly raw sensor data obtained by the signal processor from the sampled output signal;
  wherein the base portion is configured to be located closer to the machine than the upper portion and to receive machine vibrations propagating from the machine to the sensor unit.

12. The machine diagnostic data collection system of claim 11, wherein the elastomeric member further comprises a second elastomeric part and a third elastomeric part;
  wherein the second elastomeric part extends longitudinally along a face of the battery;
  wherein the third elastomeric part is located at a second end of the circuit board and a second end of the battery away from the accelerometer;
  wherein the first elastomeric part, second elastomeric part and third elastomeric pard are configured to reduce frequency response impacts of mass and volume of the second wireless interface, the signal processor, the circuit board, and the battery on dynamic behavior of the sensor unit with respect to machine vibrations by damping vibrations introduced by said second wireless interface, circuit board, signal processor, and battery in response to said machine vibrations.

13. The machine diagnostic data collection system of claim 12, wherein the accelerometer is a tri-axial accelerometer having one or more sensing components,
wherein the first elastomeric part separates each sensing component of said one or more sensing components from said signal processor, circuit board, and battery; and
wherein said first elastomeric part, second elastomeric part, and third elastomeric part are configured to vibrationally-decouple, in part, said each one sensing component from the signal processor, circuit board, and battery so that a frequency response rating of the accelerometer sensor device is no more than +/−3 db at 5 kHz on a z-axis.

14. The machine diagnostic data collection system of claim 12, wherein the upper portion housing has a profile in the longitudinal direction comprising a first curved portion nearest the base portion housing and a second straight or angled portion farthest from the base portion housing, wherein the first curved portion has a backward-S shape with a convex portion longer than a concave portion, and wherein a length from a maximum trough depth of the concave portion to a distal end of the upper portion housing is 20-30% of an entire longitudinal length of the upper portion housing.

15. The machine diagnostic data collection system of claim 11, wherein the upper portion further comprises a cap member mating to the upper portion housing and at which is situated an antenna.

16. A method of collecting machine diagnostic data from each one machine of a plurality of machines using a machine diagnostic data collection system comprising:
a portable data collection unit comprising a first wireless interface, a processor, a memory, a display, and an operator input device;
a sensor unit configured as a single body, removably mounted in its entirety to a test point location on said one machine in a manner by which machine vibrations propagate into said single body;
wherein the sensor unit comprises within said single body an accelerometer, a second wireless interface, a circuit board, a signal processor, and a battery;
wherein the second wireless interface is configured to transmit wirelessly in real time to the first wireless interface raw data sensed by the accelerometer;
wherein the sensor unit further comprises an elastomeric member separating a sensing component of the accelerometer from the circuit board, signal processor, and battery, the elastomeric member being configured to reduce frequency response impacts of mass and volume of the signal processor the circuit board, and the battery on dynamic behavior of the sensor unit with respect to machine vibrations by damning vibrations introduced by said circuit board signal processor, and battery in response to said machine vibrations, thereby vibrationally-isolating, in part, the sensing component from the signal processor, circuit board, and batter;
the method comprising the steps of:
removably mounting the sensor unit as said single body at a location of a test point on said one machine in a manner by which machine vibrations propagate into said single body;
receiving said machine vibrations at the sensor unit;
damping vibrations introduced by said circuit board, signal processor, and battery in response to said machine vibrations with said elastomeric member to vibrationally decouple, in part, said sensing component from the circuit board, the signal processor, and the battery, thereby reducing frequency response impacts of mass and volume of the the signal processor, the circuit board, and the battery on dynamic behavior of the sensor unit with respect to machine vibrations;
transmitting a wireless signal from the sensor unit to the portable data collection unit as part of a communication protocol for establishing a wireless data communication link between said sensor unit and said portable data collection unit;
sensing said machine vibrations with said accelerometer;
streaming raw sensor data sensed by the accelerometer to the second wireless interface using the signal processor;
transmitting said raw sensor data from said second wireless interface to said portable data collection unit;
discontinuing said streaming of raw sensor data;
dismounting the sensor unit from the machine; and
repeating each step of said method for another machine among the plurality of machines for which vibration data is to be collected; and
wherein a mounting mechanism having a first threaded member is fixedly attached to said one machine;
wherein the accelerometer is a tri-axial accelerometer;
wherein the sensor unit is a first sensor unit and has a first base portion with a second threaded member that mates to the first threaded member;
wherein said removably mounting comprises screwing the first sensor unit onto said mounting mechanism to an end of travel of the second threaded member along the first threaded member to a prescribed torque to achieve a known repeatable prescribed relative position between the first sensor unit and said one machine, in which an x-axis and y-axis of the tri-axial accelerometer are aligned, respectively with an x-axis and y-axis of measurement of said one machine; and
wherein said sensing vibration of the machine with said accelerometer, comprises sensing said vibration while said x-axis and y-axis the tri-axial accelerometer are aligned, respectively with said x-axis and y-axis of measurement of said one machine; and
further comprising removing said first sensor unit from the machine;
removably mounting a second sensor unit different from the first sensor unit to the mounting mechanism of said one machine at another time;
wherein said second sensor unit is manufactured to have a same indexing of the second sensor unit's x-axis and y-axis to a third threaded member of the second sensor unit as the first sensor unit's x-axis and y-axis to the first sensor unit's second threaded member, whereby said first sensor unit and second sensor unit are interchangeably mounted to said mounting mechanism and achieve a same circumferential reference position when screwed onto the mounting mechanism to a prescribed torque without further individualized referencing at the time of mounting;
said removably mounting said second sensor unit to said mounting mechanism thereby achieving a same known repeatable prescribed relative position between the second sensor unit and said one machine as achieved when mounting the first sensor unit to the mounting mechanism of said one machine so that said second sensor unit's x-axis and y-axis are aligned, respectively with said x-axis and y-axis of measurement of said one machine.

17. A method of collecting machine diagnostic data from each one machine of a plurality of machines using a machine diagnostic data collection system comprising:
- a portable data collection unit comprising a first wireless interface, a processor, a memory, a display, and an operator input device;
- a sensor unit configured as a single body, removably mounted in its entirety to a test point location on said one machine in a manner by which machine vibrations propagate into said single body;
- wherein the sensor unit comprises within said single body an accelerometer, a second wireless interface, a circuit board, a signal processor, and a battery;
- wherein the second wireless interface is configured to transmit wirelessly in real time to the first wireless interface raw data sensed by the accelerometer;
- wherein the sensor unit further comprises an elastomeric member separating a sensing component of the accelerometer from the circuit board, signal processor, and battery, the elastomeric member being configured to reduce frequency response impacts of mass and volume of the signal processor, the circuit board, and the battery on dynamic behavior of the sensor unit with respect to machine vibrations by damping vibrations introduced by said circuit board, signal processor, and battery in response to said machine vibrations, thereby vibrationally-isolating, in part, the sensing component from the signal processor, circuit board, and battery;
- the method comprising the steps of:
- removably mounting the sensor unit as said single body at a location of a test point on said one machine in a manner by which machine vibrations propagate into said single body;
- receiving said machine vibrations at the sensor unit;
- damping vibrations introduced by said circuit board, signal processor, and battery in response to said machine vibrations with said elastomeric member to vibrationally decouple, in part, said sensing component from the circuit board, the signal processor, and the battery, thereby reducing frequency response impacts of mass and volume of the the signal processor, the circuit board, and the battery on dynamic behavior of the sensor unit with respect to machine vibrations;
- transmitting a wireless signal from the sensor unit to the portable data collection unit as part of a communication protocol for establishing a wireless data communication link between said sensor unit and said portable data collection unit;
- sensing said machine vibrations with said accelerometer;
- streaming raw sensor data sensed by the accelerometer to the second wireless interface using the signal processor;
- transmitting said raw sensor data from said second wireless interface to said portable data collection unit;
- discontinuing said streaming of raw sensor data;
- dismounting the sensor unit from the machine; and
- repeating each step of said method for another machine among the plurality of machines for which vibration data is to be collected; and
- further comprising after said mounting and before said dismounting of the sensor unit from said location on said machine, the steps of:
- capturing, with a camera embedded in said portable, machine-diagnostic, data collection unit, a photographic image of the sensor unit as mounted at said location on said machine; and
- automatically storing said captured image with instructions for gathering data at said location of said machine; and
- further comprising after said dismounting during a setup operation for a subsequent collection of machine vibration data from said location at said machine: displaying at said display instructions for gathering data at said location of said machine; and
- automatically displaying said captured photographic image among said instructions as a default image for showing positioning of the sensor unit on said machine at said location.

18. A method of collecting machine diagnostic data from each one machine of a plurality of machines using a machine diagnostic data collection system comprising:
- a portable data collection unit comprising a first wireless interface, a processor, a memory, a display, and an operator input device;
- a sensor unit configured as a single body, removably mounted in its entirety to a test point location on said one machine in a manner by which machine vibrations propagate into said single body;
- wherein the sensor unit comprises within said single body an accelerometer, a second wireless interface, a circuit board, a signal processor, and a battery;
- wherein the second wireless interface is configured to transmit wirelessly in real time to the first wireless interface raw data sensed by the accelerometer;
- wherein the sensor unit further comprises an elastomeric member separating a sensing component of the accelerometer from the circuit board, signal processor, and battery, the elastomeric member being configured to reduce frequency response impacts of mass and volume of the signal processor, the circuit board, and the battery on dynamic behavior of the sensor unit with respect to machine vibrations by damping vibrations introduced by said circuit board, signal processor, and battery in response to said machine vibrations, thereby vibrationally-isolating, in part, the sensing component from the signal processor, circuit board, and battery;
- the method comprising the steps of:
- removably mounting the sensor unit as said single body at a location of a test point on said one machine in a manner by which machine vibrations propagate into said single body;
- receiving said machine vibrations at the sensor unit;
- damping vibrations introduced by said circuit board, signal processor, and battery in response to said machine vibrations with said elastomeric member to vibrationally decouple, in part, said sensing component from the circuit board, the signal processor, and the battery, thereby reducing frequency response impacts of mass and volume of the the signal processor, the circuit board, and the battery on dynamic behavior of the sensor unit with respect to machine vibrations;
- transmitting a wireless signal from the sensor unit to the portable data collection unit as part of a communication protocol for establishing a wireless data communication link between said sensor unit and said portable data collection unit;
- sensing said machine vibrations with said accelerometer;
- streaming raw sensor data sensed by the accelerometer to the second wireless interface using the signal processor;
- transmitting said raw sensor data from said second wireless interface to said portable data collection unit;
- discontinuing said streaming of raw sensor data;

dismounting the sensor unit from the machine; and
repeating each step of said method for another machine among the plurality of machines for which vibration data is to be collected; and
wherein the data collection unit further comprises an embedded camera, and the method further comprising:
storing in memory a set of non-photographic standard graphic images, in which each standard graphic image of the set depicts a different mounting orientation of the sensor unit relative to a machine mount;
storing in memory data collection instructions associated with the test point; as part of a machine diagnostic data collection first route including said location of said test point on said rotating machine, displaying on the display said data collection instructions associated with said test point and including on the display with said data collection instructions an image area occupying less than an entirety of the touchscreen within which a default image is displayed, wherein said default image is one of a placeholder image, an image from among said set of standard graphic images, or a photographic image of the sensor unit mounted at said location;
while the sensor unit is removably mounted to said location during performance of said machine diagnostic data collection first route, capturing a photographic image of a field of view of the embedded camera;
receiving from the user input device an indication that the photographic image is for data collection instruction;
setting by said processor said captured photographic image as the default image, and during a subsequent performance of a second route that includes said location of said test point of said rotating machine, displaying on the touchscreen said data collection instructions associated with said test point and including on the touchscreen with said data collection instructions in said image area occupying less than said entirety of the touchscreen said captured photographic image;
receiving from the user input device an indication that the photographic image is for storage as a data collection result;
storing said processor said captured photographic image among data collection results for the machine; and
receiving machine vibration data from said sensor unit into said data collection interface.

19. A machine diagnostic data collection system for collecting vibration data from a rotating machine, the system comprising:
a portable data collection unit comprising a first wireless interface, a processor, memory, a display, and an operator input device;
a sensor unit configured as a single body, removably mounted in its entirety to a test point location on the machine in a manner by which machine vibrations propagate into said single body;
wherein the sensor unit comprises within said single body an accelerometer, a second wireless interface, a circuit board, a signal processor, and a battery;
wherein the second wireless interface is configured to transmit wirelessly in real time to the first wireless interface raw data sensed by the accelerometer;
wherein the sensor unit further comprises an elastomeric member separating a sensing component of the accelerometer from the circuit board, signal processor, and battery, the elastomeric member being configured to reduce frequency response impacts of mass and volume of the signal processor the circuit board, and the battery on dynamic behavior of the sensor unit with respect to machine vibrations by damping vibrations introduced by said circuit board, signal processor, and battery in response to said machine vibrations, thereby vibrationally-isolating, in part, the sensing component from the signal processor, circuit board and battery;
wherein the elastomeric member comprises a first elastomeric part, a second elastomeric part and a third elastomeric part;
wherein the first elastomeric part separates the sensing component of the accelerometer from the circuit board, signal processor, battery, and second wireless interface, the first elastomeric part located at a first end of the circuit board and a first end of the battery;
wherein the second elastomeric part extends longitudinally along a face of the rechargeable battery;
wherein the third elastomeric part is located at a second end of the circuit board and a second end of the battery away from the accelerometer;
wherein the first elastomeric part, second elastomeric part and third elastomeric pard are configured to reduce frequency response impacts of mass and volume of the second wireless interface, the signal processor, the circuit board, and the battery on dynamic behavior of the sensor unit with respect to machine vibrations by damping vibrations introduced by said second wireless interface, circuit board, signal processor, and battery in response to said machine vibrations; and
wherein the sensor unit has a frequency response rating of no more than +/−3 db at 5 kHz on a z-axis.

20. The machine diagnostic data collection system of claim 19, wherein the sensor unit is a first sensor unit and further comprising a second sensor unit of a same construction removably mounted in its entirety to a second test point location on the machine, wherein said accelerometer of each one of said first and second sensor unit is a tri-axial accelerometer; and
wherein said first and second sensor unit are manufactured to have a threaded unit for mounting the respective sensor unit to the machine, the threaded unit having a same indexing of an x-axis and y-axis, whereby said first sensor unit and second sensor unit are interchangeably mounted to said machine and achieve a same circumferential reference position when screwed onto a mounting mechanism to a prescribed torque without further individualized referencing at the time of mounting.

* * * * *